(12) United States Patent
Lamb

(10) Patent No.: US 6,867,688 B2
(45) Date of Patent: Mar. 15, 2005

(54) APPARATUS AND METHOD FOR PROVIDING WEATHER AND OTHER ALERTS

(75) Inventor: George W. Lamb, Atlanta, GA (US)

(73) Assignee: Safety Through Cellular, Inc., Atlanta, GA (US)

( * ) Notice: Subject to any disclaimer, the term of this patent is extended or adjusted under 35 U.S.C. 154(b) by 0 days.

(21) Appl. No.: 10/449,284

(22) Filed: May 30, 2003

(65) Prior Publication Data

US 2003/0193394 A1 Oct. 16, 2003

Related U.S. Application Data

(63) Continuation-in-part of application No. 10/016,307, filed on Dec. 10, 2001, now Pat. No. 6,617,964, which is a continuation-in-part of application No. 09/330,667, filed on Jun. 11, 1999, now Pat. No. 6,329,904.

(51) Int. Cl.[7] .................................................. G08B 9/00
(52) U.S. Cl. .............................. 340/286.02; 340/7.48; 340/531; 340/539; 340/628
(58) Field of Search ........................ 340/286.02, 7.48, 340/531, 539.1, 621, 511, 825.72, 628, 286.05

(56) References Cited

U.S. PATENT DOCUMENTS

| | | |
|---|---|---|
| 3,701,024 A | 10/1972 | Knowles et al. |
| 4,019,142 A | 4/1977 | Wycoff |
| 4,155,042 A | 5/1979 | Permut et al. |
| 4,415,771 A | 11/1983 | Martinez |
| 4,435,843 A | 3/1984 | Eilers et al. |
| 4,633,515 A | 12/1986 | Uber et al. |
| 4,956,875 A | 9/1990 | Bernard et al. |
| 5,121,430 A | 6/1992 | Ganzer et al. |
| 5,195,126 A | 3/1993 | Carrier et al. |
| 5,241,305 A | 8/1993 | Fascenda et al. |
| 5,272,465 A | 12/1993 | Meares, Jr. |

(List continued on next page.)

OTHER PUBLICATIONS

US 5,867,805, 2/1999, Brown (withdrawn)
Monica Allevere, "Paging Company Warns Its Users," Wireless Week, Feb. 17, 1997.

(List continued on next page.)

*Primary Examiner*—Davetta W. Goins
(74) *Attorney, Agent, or Firm*—Ralph P. Albrecht; Venable LLP

(57) ABSTRACT

An apparatus, including an alert device having a receiver, and method are provided for receiving alert information broadcast via particular telecommunication transmitters operating within a cellular, PCS, or other wireless telecommunications network, thereby allowing delivery of a message. The alert device includes a receiver for receiving digital messages in the form of broadcast messages on a digital control channel, a microcomputer having a monitoring circuit that monitors received digital messages for the presence of an alert code associated with alert messages regarding an alert condition, and a plurality of peripheral devices which produce various tones and flashing lights in response to the alert device's reception of an appropriate alert message. The alert device can be provisioned over the air to respond to particular preferred system providers and controlled user groups. The alert device can also control and external device to provide a warning to the user.

20 Claims, 16 Drawing Sheets

U.S. PATENT DOCUMENTS

| | | | |
|---|---|---|---|
| 5,278,539 | A | 1/1994 | Lauterbach |
| 5,444,433 | A | 8/1995 | Gropper |
| 5,448,618 | A | 9/1995 | Sandlerman |
| 5,461,365 | A | 10/1995 | Schlager et al. |
| 5,481,254 | A | 1/1996 | Gaskill |
| 5,493,286 | A | 2/1996 | Grube et al. |
| 5,499,196 | A | 3/1996 | Pacheco |
| 5,530,438 | A | 6/1996 | Bickham et al. |
| 5,533,094 | A | 7/1996 | Sanmugam |
| 5,565,909 | A | 10/1996 | Thibadeau et al. |
| 5,574,999 | A | 11/1996 | Gropper |
| 5,628,050 | A | 5/1997 | McGraw et al. |
| 5,848,378 | A | 12/1998 | Shelton et al. |
| 6,023,223 | A | 2/2000 | Baxter, Jr. |
| 6,031,455 | A | 2/2000 | Grube et al. |
| 6,091,956 | A * | 7/2000 | Hollenberg ................. 455/456 |
| 6,104,582 | A | 8/2000 | Cannon et al. |
| 6,112,074 | A | 8/2000 | Pinder |
| 6,112,075 | A | 8/2000 | Weiser |
| 6,121,885 | A | 9/2000 | Masone et al. |
| 6,204,761 | B1 | 3/2001 | Vanderable |
| 6,329,904 | B1 | 12/2001 | Lamb |
| 6,462,665 | B1 | 10/2002 | Tarlton et al. |
| 6,490,525 | B2 | 12/2002 | Baron et al. |
| 6,493,633 | B2 | 12/2002 | Baron et al. |
| 6,617,964 | B1 | 9/2003 | Lamb |

OTHER PUBLICATIONS

UNKNOWN, "CTIA Proposes Standard for Emergency Service Link," Mobile Phone News, Jun. 15, 1998. Reprinted from Lexis/Nexis.

Lorraine Kee, "Cellular Phones May Be Linked to Warning System," Scripps Howard Newspapers Press Journal, Jun. 11, 1998. Reprinted from Lexis/Nexis.

Kristen Beckman, "In Case of Emergency, Find Your Cell Phone," Radio Comm. Report, Crain Communications, Inc., May 11, 1998.

UNKNOWN, "St. Louis Firm Lobbies to Send Emergency Signals to Wireless," Sacramento Bee, McClathy Newpapers, Inc. Apr. 1, 1998.

Kristen Beckman, "C–EASA Says Tower Siting Is Key For Safety System," Radio Comm. Report, Crain Communications, Inc., Dec. 22, 1997.

Miscellaneous RCR News Website Information, http://widespeccom/renews.htm. Printed May 7, 1999.

* cited by examiner

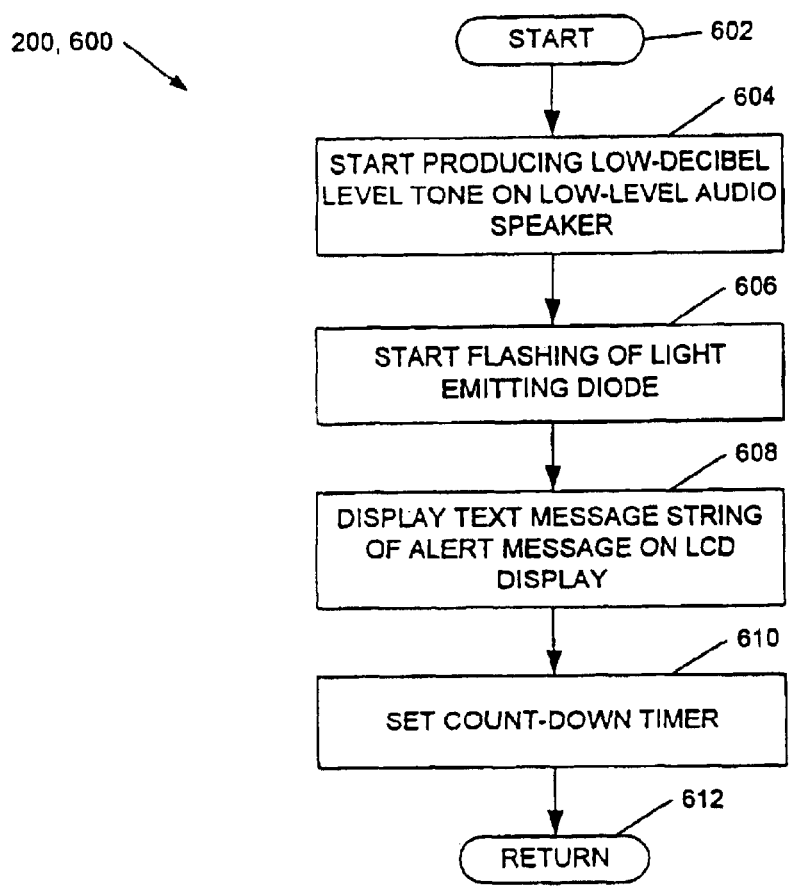

APPARATUS AND METHOD FOR PROVIDING WEATHER AND OTHER ALERTS

CROSS REFERENCE TO RELATED APPLICATION

This patent application is a continuation-in-part of, U.S. patent application Ser. No. 10/016,307 filed on Dec. 10, 2001 now U.S. Pat. No. 6,617,964, which is a continuation-in-part of U.S. patent application Ser. No. 09/330,667 filed on Jun. 11, 1999 and issued as U.S. Pat. No. 6,329,904. This application also claims the benefit of the filing date of U.S. Pat. No. 6,329,904.

FIELD OF THE INVENTION

This invention relates generally to the field of alert systems and, in its preferred embodiments, to alert systems utilizing cellular, personal communication system, or wireless telecommunication technology to deliver an alert to an alert device.

BACKGROUND OF THE INVENTION

In recent decades, the science of meteorology has advanced rapidly, allowing increasingly accurate detection and prediction of severe and hazardous weather. Specifically, Doppler radar systems and high-resolution satellites have been developed which allow early detection of tornadoes and severe thunderstorms and accurate tracking of their paths. The National Weather Service (NWS) and National Oceanographic and Atmospheric Administration (NOAA) now routinely issue warnings in advance of most severe or tornadic storms, alerting individuals and saving lives. However, in order for these warnings, or "alerts" to be effective, they must be communicated to and received by their intended recipients.

Some local governments and municipalities utilize civil defense siren systems to provide warnings to persons within the localized range of the siren systems in case of severe weather, natural disaster, war or other emergency conditions. However, weather-related warnings are more commonly provided through the NOAA Weather Radio system, a nationwide network of radio stations operating twenty-four (24) hours per day to broadcast continuous weather information directly from the local offices of the National Weather Service. The NOAA Weather Radio system also broadcasts alerts for the Emergency Alert System (EAS), maintained by the Federal Communication Commission, in order to provide emergency warnings for all types of hazards, including, but not limited to, earthquakes, volcano erruptions, severe weather and nuclear war. The NOAA Weather Radio system has more than 450 transmitters, covering broad areas in each of the 50 states, adjacent coastal waters, Puerto Rico, the U.S. Virgin Islands, and the U.S. Pacific Territories. Unfortunately, reception of the Emergency Alert System warnings via the NOAA Weather Radio system generally requires a special radio receiver or scanner capable of picking up its emergency warning signals.

Tone-activated alert receivers are commonly used to monitor NOAA Weather Radio broadcasts, to provide warning of severe weather and to provide emergency and civil defense alerts. A tone-activated alert receiver constantly monitors the local NOAA Weather Radio broadcasts for a specific 1050 Hz emergency alert tone. In response to receiving an emergency alert tone, a tone-activated alert receiver produces an audible and/or visual alarm, and activates a radio tuned to the NOAA Weather Radio broadcast. Since each NOAA Weather Radio station transmits its signals to a relatively large geographical area, older tone-activated alert receivers suffer from the disadvantage of falsely responding to alerts when the condition to which the emergency alert pertains is only relevant to other geographical areas in the broadcast area of the particular NOAA Weather Radio station transmitting the alert tone.

Newer NOAA Weather Radio receivers, known as "SAME receivers", incorporate a feature known as Specific Area Message Encoding (SAME) to decrease the frequency of false alerts. A SAME receiver recognizes a specific digital location code, in an emergency broadcast signal, which designates a specific locality for which alerts are relevant. Once programmed by a user to respond only to a specific digital location code for the area of the user, a SAME receiver switches into alarm mode only upon receipt of an emergency broadcast signal, which includes a SAME digital location code matching the preprogrammed digital code. Accordingly, SAME receivers are generally deployed in a particular, fixed location such as an individual's home or office. While these SAME receivers are useful in their fixed locations, they are not particularly useful if moved from the location for which they have been programmed. Additionally, like many individuals who cannot program a videocassette recorder (VCR), some individuals may find it difficult or inconvenient to program the SAME receiver.

As an alternative to SAME receivers, some persons are proposing that cellular or Personal Communication System (PCS) wireless telephone networks be employed to deliver emergency alerts to individuals having cellular or PCS wireless telephones because cellular and PCS telephone networks typically employ short-range, broadcast transceivers (or transmitters) which have coverage areas, or cells, of a reasonably small size, thereby enabling the delivery of emergency alerts to persons in selected areas served by particular broadcast transmitters. As proposed, delivery of emergency alert messages to selected local areas would be achieved by activating only those cellular or PCS broadcast transceivers providing coverage for the specific geographical area to which the emergency alert is relevant, instead of requiring the transmission, preprogramming, and recognition of a specific digital location code corresponding to the geographical area for which the emergency alert is relevant. However, until recently, wireless telephone networks have not had the capability of transmitting alphanumeric messages that would be required to effectively distribute emergency alert messages. In contrast, conventional paging systems have the capability of supporting alphanumeric messaging, but have coverage areas far to large to provide the level of geographical specificity required to deliver location specific, emergency alert messages.

New cellular and PCS telephone networks are currently being deployed, or have been deployed, throughout North America and Europe which are capable of transmitting alphanumeric messages and which have coverage areas providing sufficient geographical specificity to make them ideal vehicles for the delivery of location-specific, emergency alert messages. Using the newer cellular and PCS networks, a network operator can send messages to a cellular or PCS telephone present in any single cell or any group of cells serviced by the transceivers of the network. Accordingly, some persons have recently proposed that these cellular and PCS networks be used to transmit location-specific, emergency alert messages to the cellular or PCS telephone handsets of individual users by dialing the telephone number associated with each handset and, upon answer by the cellular or PCS handset, delivering the emergency alert message to the handset.

While cellular or PCS telecommunications systems may be an effective vehicle for conveying location-specific, emergency alert messages, such systems enable delivery of emergency alert messages to only those individuals who can figure out how get such messages via their wireless telephones. Currently, to get such messages, individuals must find their way through a myriad of icons (which many individuals cannot do) and then review all of their messages in order to identify the emergency alert messages from other messages. Further, the delivery of emergency alert messages via cellular or PCS telecommunications systems requires individuals to have their handsets nearby and turned-on (and not depleted of battery power). Unfortunately, individuals often turn-off their handsets, forget to recharge them, or leave their handsets, for instance, in the car while they are at home or work. As a result, a system that relies upon cellular or PCS handset receivers to receive emergency alert messages may fail to notify a large number of individuals of the existence of an emergency condition.

Other similar difficulties are inherent in the delivery of information or messages that relate to military or other operations (i.e., a different type of "alert"). For instance, if a branch of the military needs to inform its reservists to report for duty on Sunday instead of Saturday as the reservists were originally notified, it typically contacts each reservist individually by telephone to provide the reservist with such information, thereby requiring a substantial use of labor to perform such a task.

Therefore, there is a need in the industry for an apparatus and method whereby individuals may reliably receive cellular or PCS transmissions of location-specific alert information without requiring the use of a cellular or PCS telephone handset. Furthermore, there is a need for an apparatus and method whereby individuals may reliably receive cellular or PCS transmissions of location-specific alert information without requiring individuals to perform complex retrieval steps or inconvenient receiver programming steps.

SUMMARY OF THE INVENTION

Briefly described, the present invention comprises an alert apparatus and method for receiving a location-specific alert (i.e., an alert directed and relevant to a particular geographical area) and for informing a user, who may be visually or hearing impaired, of the existence and severity of the alert. More particularly, the present invention includes an alert apparatus and method which allow a user to receive data corresponding to an alert which has been broadcast via particular transmitters operating within a cellular, PCS, or wireless telephone communications network, thereby allowing receipt of a location-specific alert (and a textual message associated with the alert) without requiring the user to input, to the alert apparatus, data representative of or identifying the location of the apparatus. Further, the present invention includes an alert apparatus and method which produces high-decibel level audible sounds and high-intensity flashing strobe light corresponding to alerts of the most severe level and which produces low-decibel level audible sounds and low-intensity flashing light from a light-emitting diode corresponding to alerts of a less severe level.

In accordance with the preferred embodiment, the apparatus of the present invention comprises an alert device having a microcomputer that directs operation of the alert device according to the instructions of a computer software program stored therein. The alert device also includes a receiver that receives digital PCS transmissions broadcast over a PCS or cellular telecommunication network. The microcomputer has a central processing unit and a monitoring circuit communicatively connected to the central processing unit and receiver. The monitoring circuit is capable of setting the receiver to receive transmissions, if any, on radio channels identified by the central processing unit, of determining the signal strength associated with transmissions received on such radio channels, of identifying the presence of a digital control channel on a radio channel, and of communicating signal strength information, digital control channel information, and broadcast short messages, received by the receiver, to the central processing unit.

According to the preferred embodiment of the present invention, the alert device further comprises a plurality of peripheral devices and the microcomputer further comprises a peripheral device controller which connects to the plurality of peripheral devices. The plurality of peripheral devices includes a liquid crystal display, a high-level audio speaker, a low-level audio speaker, a high-intensity strobe light, and a low-intensity light-emitting diode. The microcomputer, via the peripheral device controller, controls the operation of the plurality of peripheral devices according to the severity of a condition identified by an alert. For instance, the microcomputer causes the production of audible sound from the high-level audio speaker at a high-decibel level and flashing of the high-intensity strobe light to warn a user of the existence of a "Level One" alert (i.e., the most severe or important alert condition). Similarly, the microcomputer causes the production of audible sound from the low-level audio speaker at a low-decibel level and flashing of the low-intensity light-emitting diode to warn a user of the existence of a "Level Two" alert (i.e., a less severe or less important alert condition). The microprocessor, via the peripheral device controller, also causes the display, on the liquid crystal display, of textual information received as part of an alert message.

The alert device, in accordance with the preferred embodiment, is operable to continuously monitor broadcasts from a cellular, PCS, or wireless telecommunications network. Accordingly, the alert device connects to an electrical outlet to receive electrical power for normal operation, but includes a battery backup and charging circuit to ensure operation of the alert device even in the event of a power failure. Furthermore, in the preferred embodiment, the alert device operates continuously when supplied with electrical power, has no on/off switch, and thus cannot easily be deactivated by a user unlike a cellular or PCS telephone handset. The alert device does, however, include a reset pushbutton that enables a user to temporarily deactivate, or stop, the audible and visual alarms once notified of an alert condition. In the preferred embodiment, the alert device is mountable to an electrical wall socket in a manner substantially similar to that of a conventional smoke detector. In an alternate embodiment, the alert device has an enclosure that enables the device to reside atop a table or other surface in a manner substantially similar to that of a weather radio. In an alternate preferred embodiment, the alert device includes a plurality of peripheral devices that are locatable at sites remote from the alert device.

In accordance with a method of the preferred embodiment of the present invention, the alert device operates according to the instructions of a computer software program residing in the microcomputer and performs a self-test when powered-up to determine whether the alert device is functioning properly. The alert device, through cooperation between the microcomputer, monitoring circuit, and receiver, then scans a factory-set, pre-identified set of radio channels comprising a range of channels used by compatible cellular or PCS telecommunication networks in order to identify the channel associated with the cellular or PCS transmitter which transmits on a digital control channel and which has the strongest signal strength at the location of the alert device. The alert device then locks onto and passively monitors the selected channel for digital alerts in the form of broadcast messages. Because the alert device passively monitors PCS network broadcasts, use of the alert device should not result in the user incurring periodic service charges from the network provider.

According to the method of the present invention, the alert device, upon detecting and receiving a broadcast message, identifies whether the broadcast message comprises an alert message. If so, the alert device then analyzes the alert message and determines the severity level of the alert identified by the alert message. If the alert is a "Level One" alert, the alert device operates, as described above, the high-level audio speaker to produce a highly obtrusive, high-decibel level sound substantially similar to that of a conventional smoke detector (i.e., a sound that would cause even the hardest of sleepers to awaken) and the high-intensity strobe light to produce flashing, high-intensity, bright light. If the alert is a "Level Two" alert, the alert device operates, as described above, the low-level audio speaker to produce a less-obtrusive, low-decibel level, "chirping" sound and the low-intensity light-emitting diode to produce less-intense, less-bright, flashing light. Regardless of the severity level of the alert, the alert device extracts textual message information, if any, from the alert message and displays the textual message information on the liquid crystal display to provide a user with a more detailed explanation as to the nature of the alert. Once the user is informed as to the existence and nature of the alert, the production of audible sounds and the generation of flashing light is terminable by the user through depression of the reset pushbutton protruding partially from the alert device.

In accordance with an alternate preferred embodiment of the present invention, the alert device is operable with an alert messaging system of a service provider which provides different levels of service (i.e., service levels or modes) to a user of the alert device in exchange for a subscription fee paid to the service provider by the user. The plurality of service levels or modes enable different classifications of alert messages to be related to and associated with the subscription status of a user (i.e., the service level selected by, subscribed to, and paid for by a user). Based upon the service level selected by the user and stored in a service level data element of the user's alert device, the user's alert device will provide that level of service to the user. For example and not limitation, a user may select a service level from any of the following levels: fully enabled; partially enabled; or, fully disabled. The user pays a subscription fee to the service provider in an amount determined by the selected service level, and the service provider causes a service level data element stored at the user's alert device to be set to a value indicating the service level or mode selected by the user. Once set, the user's alert device operates at the selected service level. In the fully enabled mode, the alert device reacts to all alert messages and provides the user with any received information pertaining to the corresponding alert. In the partially enabled mode, the alert device only reacts to the most severe alerts (i.e., "Level One" alerts) to provide subscribers with a minimal level of service and warnings. In the fully disabled mode, the alert device does not react to any alerts. Such operability allows a service provider of alert messages to establish and enforce compliance with a subscription system.

According to another alternate preferred embodiment of the present invention, the alert device is operable with an alert messaging system of a service provider which provides a service level that enables the user's alert device to receive and react to an advertisement that is present in the body of an alert message. In operation, the service provider causes a service level data element stored at the user's alert device to be set to a value indicating that the user's alert device is to display received advertisements on the device's display. Then, whenever the alert device receives a message having a service level with that value, the alert device extracts an advertisement from the body of the message and displays it on the alert device's display.

Accordingly, it is an object of the present invention to provide an apparatus and method for receiving location-specific alert information without requiring a user to input data representative of the user's location.

Another object of the present invention is to provide an apparatus and method for receiving location-specific alert information that is not limited to a fixed location.

Still another object of the present invention is to provide an apparatus for receiving location-specific alert information that can be moved from an old location to a new location without requiring reprogramming or the input of data representative of the new location.

Still another object of the present invention is to provide an apparatus for receiving location-specific alert information that self-identifies the strongest source of such alert information.

Still another object of the present invention is to provide an apparatus for receiving location-specific alert information that self-identifies the frequency on which the alert information is transmitted or broadcast.

Still another object of the present invention is to provide an apparatus and method for receiving location-specific alert information that identifies the different levels of severity associated with alerts.

Still another object of the present invention is to provide an apparatus and method for receiving location-specific alert information that produces different sensory outputs corresponding to the different levels of severity or importance of alerts.

Still another object of the present invention is to provide an apparatus and method for receiving location-specific alert information which operates continuously, unless moved by a user, at a particular location.

Still another object of the present invention is to provide an apparatus and method for receiving location-specific alert information which is continuously operable from an external electrical power source and which has an internal battery backup for use during power failures.

Still another object of the present invention is to provide an apparatus and method for receiving location-specific alert information which displays a textual message related to the alert for which the alert information pertains.

Other objects, features and advantages of the present invention will become apparent upon reading and understanding the present specification when taken in conjunction with the appended drawings.

BRIEF DESCRIPTION OF THE DRAWINGS

FIG. 11 is a flowchart representation of a low-level alarm routine of the computer software program of the alert device in accordance with a method of the preferred embodiment of the present invention.

DETAILED DESCRIPTION

Figure 1:
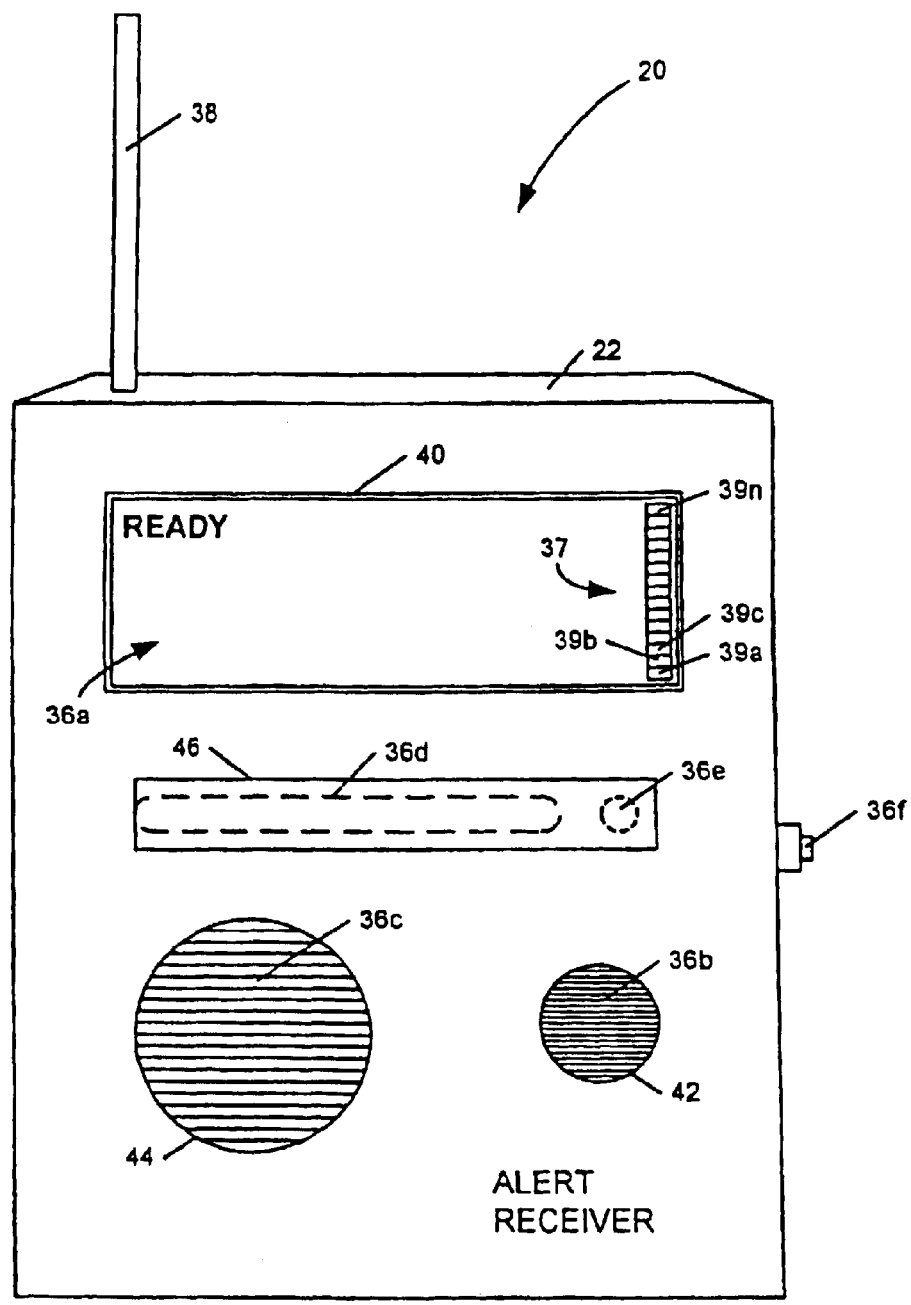
FIG. 1 is a pictorial representation of an alert device in accordance with a preferred embodiment of the present invention.
Figure 2:
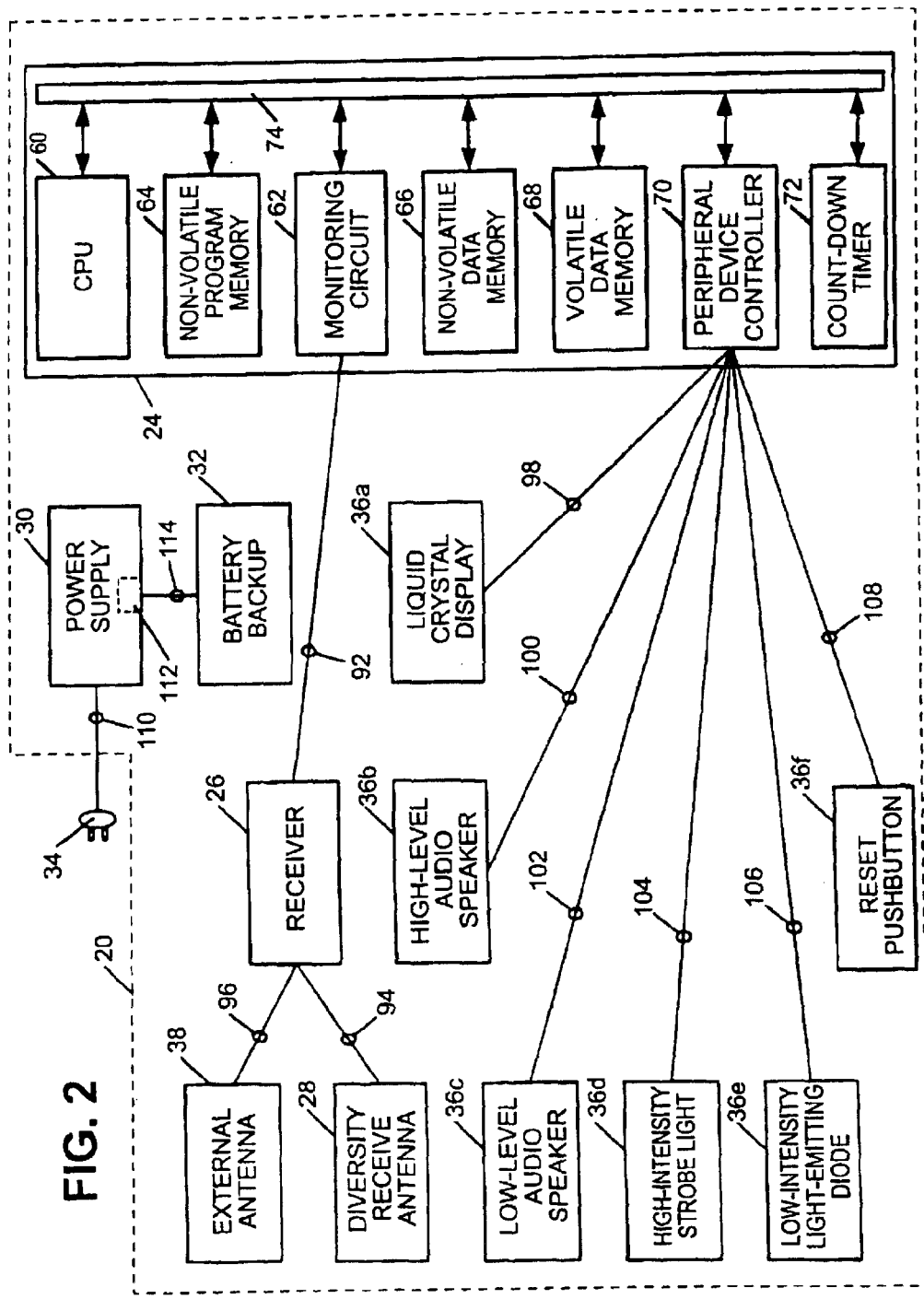
FIG. 2 is a block diagram representation of the alert device of FIG. 1 displaying the major components thereof

Referring now to the drawings, in which like numerals represent like components throughout the several views, an alert device 20, in accordance with an apparatus of the preferred embodiment of the present invention, is shown in pictorial form in FIG. 1 and in block diagram form in FIG. 2. The alert device 20 comprises an enclosure 22 and a microcomputer 24, receiver 26, diversity receive antenna 28, power supply 30, and backup battery 32 residing therein. Preferably, the enclosure 22 is manufactured from a durable plastic material and the alert device 20 is directly pluggable into an electrical wall outlet through use of an electrical plug 34 located on the back of the enclosure 22, thereby avoiding the need for mounting hardware and the difficulties of mounting the enclosure 22 to a wall. According to the apparatus of the preferred embodiment, the receiver 26 is adapted to receive digital signals within the ranges of channels utilized for cellular, PCS, or other wireless communications in the area in which the alert device 20 is deployed. For example and not limitation, the receiver 26 is adapted to receive digital signals on channels having receive-side frequencies in the (i) 969 MHz to 994 MHz range, (ii) 1840 MHz to 1865 MHz range, (iii) 1930.72 MHz to 1945 MHz range, (iv) 1950.72 MHz to 1965 MHz range, or (v) 1975.72 MHz to 1990 MHz range. It is understood, however, that the scope of the present invention includes similar receivers which are adapted to receive cellular, PCS, or wireless digital signals in any frequency range.

The alert device 20 further comprises a plurality of peripheral devices 36 which electrically connect to the microcomputer 24, and an external antenna 38 having a first portion which resides within the enclosure 22 and a second portion which extends outside of the enclosure 22. An external antenna 38, acceptable in accordance with the preferred embodiment, is a rubber-covered antenna commonly known as a "rubber duck antenna" which is often found in cellular, PCS, or wireless telephones.

The plurality of peripheral devices 36 includes a liquid crystal display 36a residing within the enclosure 22 adjacent to an opening 40 in the enclosure 22 that enables the liquid crystal display 36a to be visible from outside the enclosure 22. Preferably, the liquid crystal display 36a is backlit to enhance the readability of the display 36a. The liquid crystal display 36a has signal strength indicator 37 located near the right side of the display 36a. The signal strength indicator 37 comprises a plurality of liquid crystal bars 39 arranged in a, generally, vertical direction which the microcomputer 24 energizes to darken the bars 39 and, thereby indicate the signal strength of the strongest channel received by the alert device 20 at the device's then-existing location. A stronger signal strength is indicated by energization and darkening of a larger number of bars 39, while a weaker signal is indicated by energization and darkening of a smaller number of bars 39.

The plurality of peripheral devices 36 also includes a high-level audio speaker 36b and a low-level audio speaker 36c which reside within the enclosure 22 at positions adjacent respective grill-like openings 42, 44 in the enclosure 22 that allow audible sounds generated by the speakers 36b, 36c to exit the enclosure 22 to the environment surrounding the emergency alert device 20. In accordance with the preferred embodiment, the high-level audio speaker 36b includes a speaker, substantially similar to those found in smoke detectors, which produces a high-decibel level continuous or pulsating tone that is sufficiently loud to awaken a sleeping person. The low-level audio speaker 36c, according to the preferred embodiment, includes a speaker which, when appropriately activated, emits a periodic "chirp-type" sound substantially similar to the sound emitted by the speakers employed in portable pagers.

The plurality of peripheral devices 36 additionally includes a high-intensity strobe light 36d and a low-intensity light emitting diode (LED) 36e which reside within the enclosure 22 and are visible, through a window-covered opening 46, from outside the enclosure 22. The high-intensity strobe light 36d, in accordance with the apparatus of the preferred embodiment, includes a conventional xenon flash tube which is pulsable in a periodic manner to produce a bright flash of light every one to two seconds when in use, thereby enabling the alert device 20 to draw the attention of a hearing impaired person. The low-intensity light emitting diode 36e, according to the apparatus of the preferred embodiment, includes a conventional, red light emitting diode that is pulsable in a manner similar to that employed with the high-intensity strobe light 36d. The plurality of peripheral devices 36 further includes a reset pushbutton 36f that extends through an opening in the enclosure 22 so as to be depressable by a user of the alert device 20.

Figure 3:
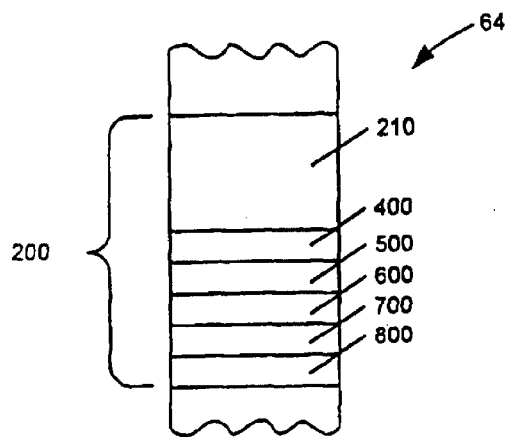
FIG. 3 is a schematic representation of the program domain of the non-volatile program memory of the alert device of FIG. 1.

The microcomputer 24 comprises, preferably, a custom-manufactured device substantially similar to those microcomputers residing in cellular, PCS, or wireless telephones and includes, integrated therein, a central processing unit (CPU) 60, a monitoring circuit 62, a non-volatile program memory 64, a non-volatile data memory 66, a volatile data memory 68, a peripheral device controller 70, and a count-down timer 72. The non-volatile program memory 64, illustrated in FIG. 3, stores a computer software program 200 having a main portion 210, a self-test routine 400, a high-level alarm routine 500, a low-level alarm routine 600, a timer interrupt handling routine 700, and a reset interrupt handling routine 800 which the CPU 60 executes, as described below, to cause the alert device 20 to operate in accordance with a method of the preferred embodiment of the present invention.

The non-volatile data memory 66, illustrated in FIG. 4, stores values for the starting channel identifier 76 and the ending channel identifier 78 of the range of channels to be monitored, or scanned, by the receiver 26 for the presence of a digital control channel as described below. The non-volatile data memory 66 also stores the value of the test channel step-size 80 and a plurality of receive frequencies 82 corresponding in a one-to-one relationship with channels to be possibly monitored by the receiver 26 (i.e., so that receive frequency 82a corresponds to the first channel possible for monitoring, receive frequency 82b corresponds to the second channel possible for monitoring, and receive frequency 82n corresponds to the $n^{th}$ channel possible for monitoring. In accordance with the preferred embodiment, the non-volatile data memory 66 stores a plurality of receive frequencies 82 corresponding to the channels associated with the receive-side frequencies in (i) the 969 MHz to 994 MHz range, (ii) the 1840 MHz to 1865 MHz range, (iii) the 1930.72 MHz to 1945 MHz range, (iv) the 1950.72 MHz to 1965 MHz range, or (v) the 1975.72 MHz to 1990 MHz range. The non-volatile data memory 66 also stores a self-test time period 81 which defines the amount of time that the self-test routine 400 delays at various steps during execution.

Figure 4:
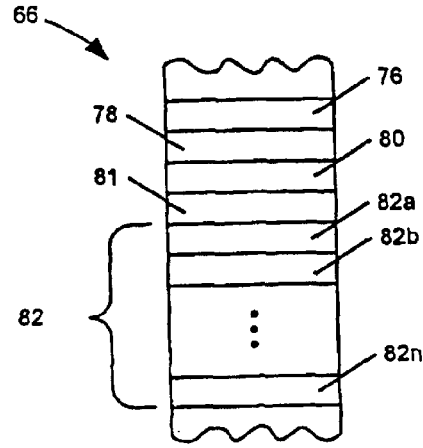
FIG. 4 is a schematic representation of the data domain of the non-volatile data memory of the alert device of FIG. 1.
Figure 5:
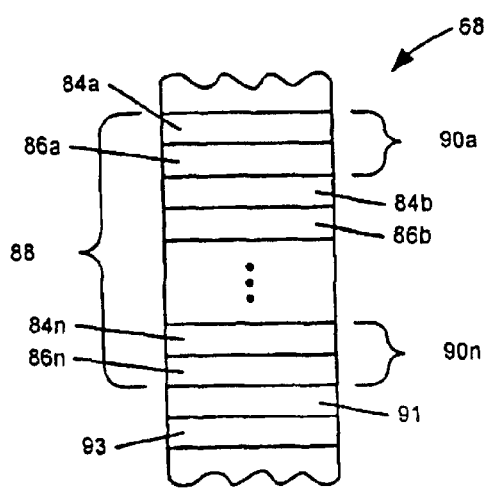
FIG. 5 is a schematic representation of the data domain of the volatile data memory of the alert device of FIG. 1.

The volatile data memory 68, illustrated in FIG. 4, stores a plurality of channel identifers 84 and a plurality of signal strength values 86 organized in a list, or table, 88 of plurality of channel identifier/signal strength pairs 90. Each channel identifier/signal strength pair 90 comprises a channel identifier 84 and a respective signal strength value 86 which represent a number identifying a digital control channel found and the associated signal strength value 86 (also referred to herein as "signal strength") identified by the receiver 26 and monitoring circuit 62 as described below. The volatile data memory 66 also stores a test channel identifier 91 and a pointer 93 to the digital control channel selected as described below (also referred to herein as a "alert channel pointer 93").

According to the preferred embodiment of the present invention, the peripheral device controller 70 is an intelligent controller which produces, at appropriate times described below, signals necessary to cause operation of each peripheral device 36 of the plurality of peripheral devices 36 as described herein. For example and not limitation, the peripheral device controller 70 produces, when necessary, signals necessary to cause the high-level audio speaker 36b to generate an obtrusive tone which should wake the soundest of sleepers, the low-level audio speaker 36c to generate "chirping" sounds, and the high-intensity strobe light 36d and the low-intensity light-emitting diode 36e to flash. The peripheral device controller 70 also ceases, at appropriate times described below, the production of signals which cause operation, for instance, of the high-level audio speaker 36b, the low-level speaker 36c, the high-intensity strobe light 36d, and the low-intensity light-emitting diode 36e.

The count-down timer 72, according to the preferred embodiment, comprises a timer which is programmable by the CPU 60 to start counting down time from an initial time provided to the count-down timer 72 by the CPU 60. Upon reaching zero, the count-down timer 72 produces an interrupt signal which is communicated to the CPU 60. The reset pushbutton 36f also produces an interrupt signal which is communicated to the CPU 60.

The microcomputer 24, as displayed in FIG. 2, further includes a bus 74 which interconnects the CPU 60 and the monitoring circuit 62, non-volatile program memory 64, non-volatile data memory 66, volatile data memory 68, peripheral device controller 70, and count-down timer 72 for the communication of address, data, and control signals (including interrupt signals) therebetween. The monitoring circuit 62 communicatively connects to the receiver 26 through signal lines 92. Receiver 26 electrically connects, via respective signal lines 94, 96, to the diversity receive antenna 28 and the external antenna 38. The peripheral device controller 70 communicatively connects to the liquid crystal display 36a, the high-level audio speaker 36b, the low-level audio speaker 36c, the high-intensity strobe light 36d, the low-intensity light emitting diode (LED) 36e, and the reset pushbutton 36f through respective signal lines 98, 100, 102, 104, 106, 108.

The power supply 30 connects, via electrical conductors 110, to electrical plug 34 for the receipt of alternating-current electrical power. The power supply 30 converts the alternating-current electrical power into direct-current electrical power at appropriate voltages. The power supply 30 also connects to the microcomputer 24, the receiver 26, and the plurality of peripheral devices 36, where necessary (although not shown in FIG. 2), for the delivery of direct-current electrical power thereto at appropriate voltages. The power supply 30 includes a charging and switching circuit 112 therein which bi-directionally connects to the backup battery 32 through conductors 114. During operation, whenever alternating-current electrical power is supplied to the alert device 20, the charging and switching circuit 112 charges the backup battery 32, if necessary, by delivering direct-current electrical power to the backup battery 32 through conductors 114. Alternatively, whenever alternating-current electrical power is not supplied to the alert device 20 (for example, due to a utility or other power failure), the backup battery 32 supplies direct-current electrical power to the charging and switching circuit 112 through conductors 114 for subsequent delivery to the microcomputer 24, the receiver 26, and the plurality of peripheral devices 36, where necessary.

Figure 6:
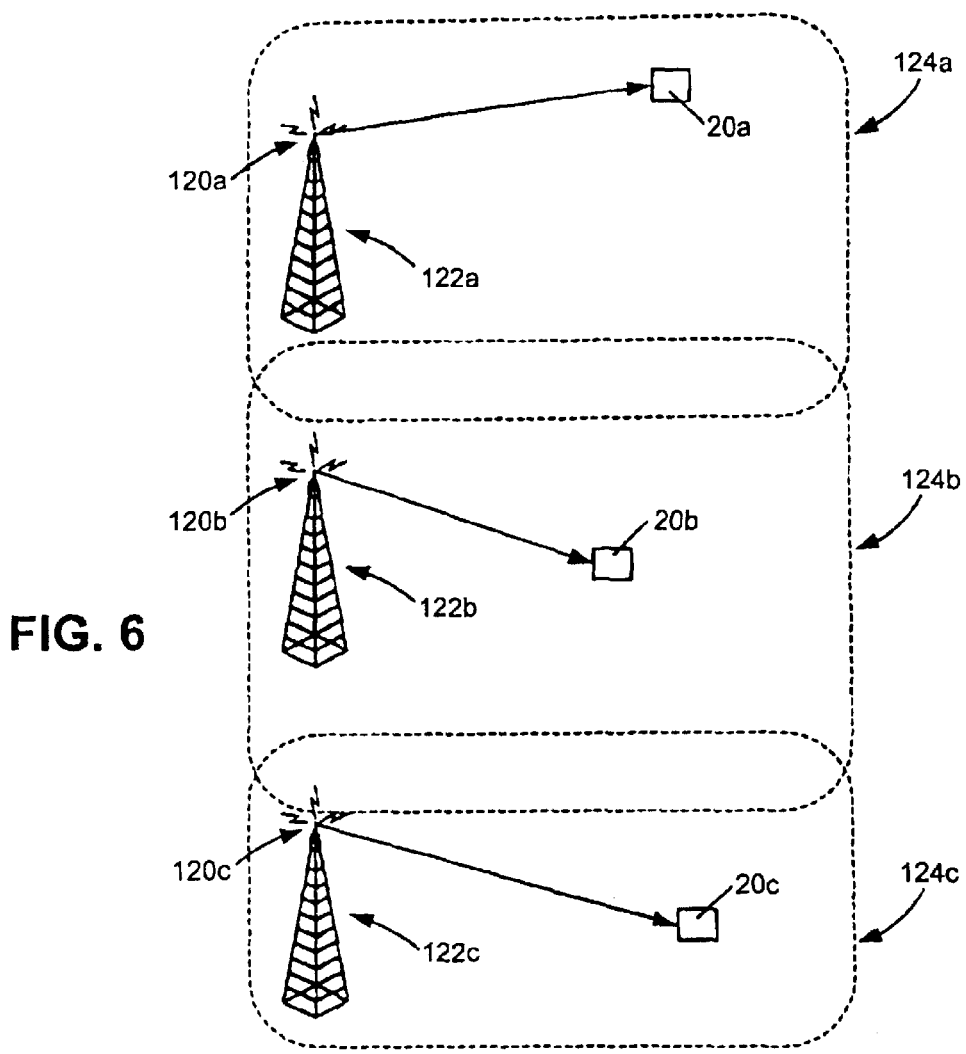
FIG. 6 is a pictorial representation of an exemplary PCS alert broadcast system in accordance with a preferred embodiment of the present invention.

In accordance with the apparatus of the preferred embodiment of the present invention, the receiver 26 further includes those receivers capable of receiving digital cellular, PCS, or wireless telecommunication signals corresponding to alert messages 130 (described below) broadcast from cellular, PCS, or wireless telecommunication transmitters 120 residing on towers 122 that are positioned to provide cellular, PCS, or wireless telecommunications services for respective, localized, and identifiable geographical areas 124 as illustrated pictorially in FIG. 6. A receiver 26 produces the alert messages 130, prior to their reception, by an alert messaging system. An alert messaging system is, typically, operated by a governmental authority and comprises telecommunications equipment, computer hardware and computer software which: (i) receives an alert from a source, for instance, the Emergency Alert System or National Weather Service or Department of Defense, (ii) determines whether one or more alert messages 130 corresponding to the alert should be broadcast, (iii) identifies the appropriate telecommunications transmitters 120 (and, hence, the geographical areas 124) to which the alert message(s) 130 should be delivered, (iv) builds and formats the alert message(s) 130 appropriately, and (v) communicates the alert message(s) 130 to a cellular, PCS, or wireless telecommunications network for routing of the alert message(s) 130 to the identified telecommunications transmitter(s) 120 which, subsequently, broadcast the alert message(s) 130 to their respective geographical area(s) 124.

Figure 7:
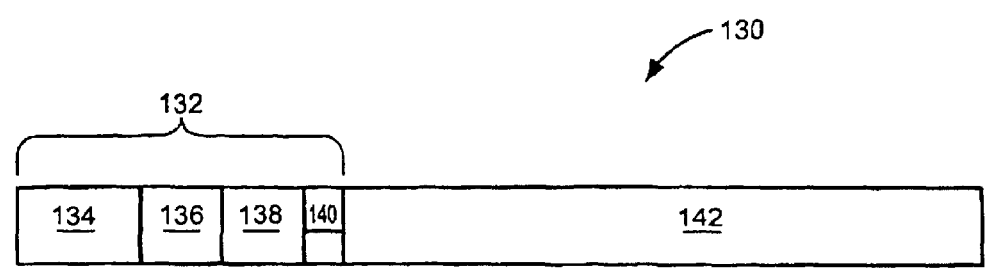
FIG. 7 is a schematic representation of the data of a digital alert message in accordance with a preferred embodiment of the present invention.
Figure 8A:
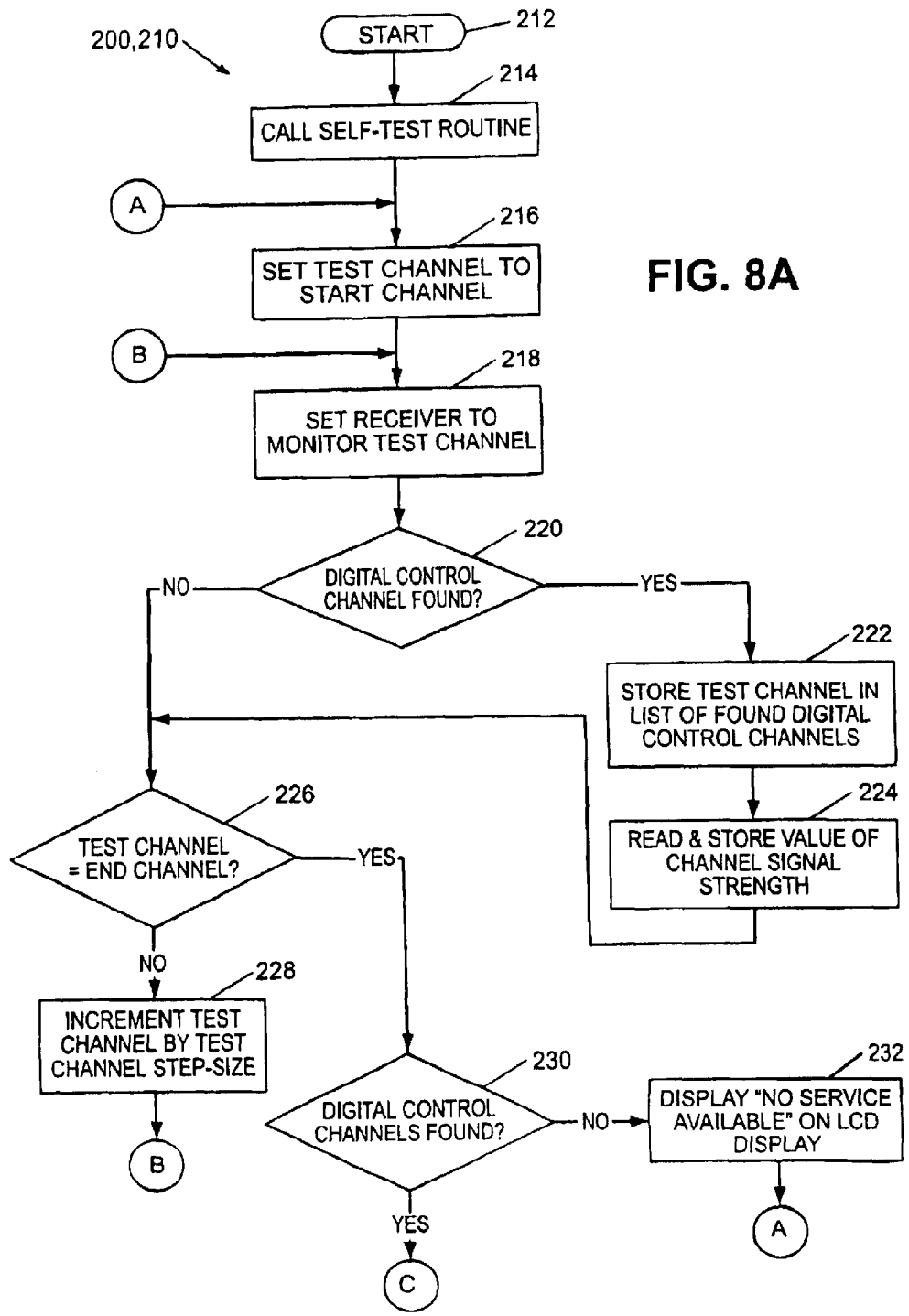
FIGS. 8a–d are flowchart representations of a main portion of a computer software program of the alert device in accordance with a method of the preferred embodiment of the present invention.
Figure 8B:
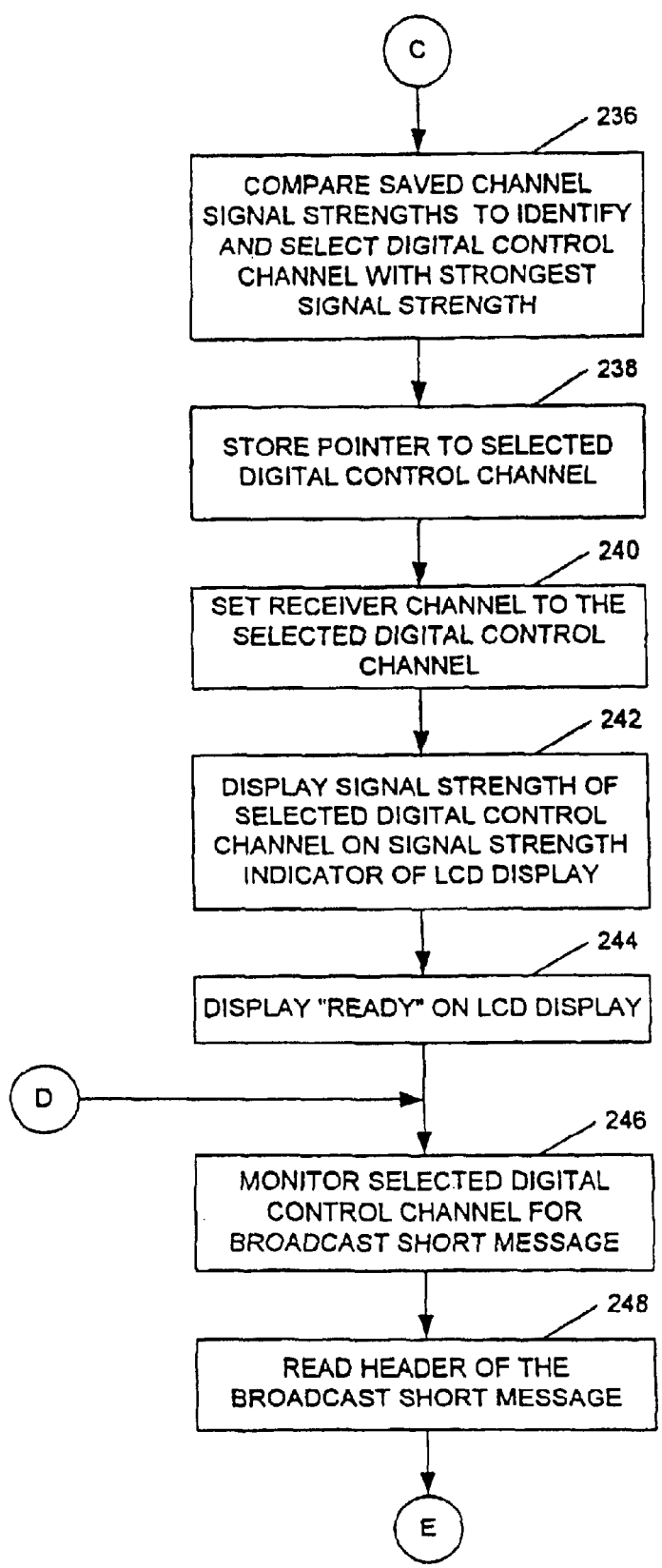
Figure 8C:
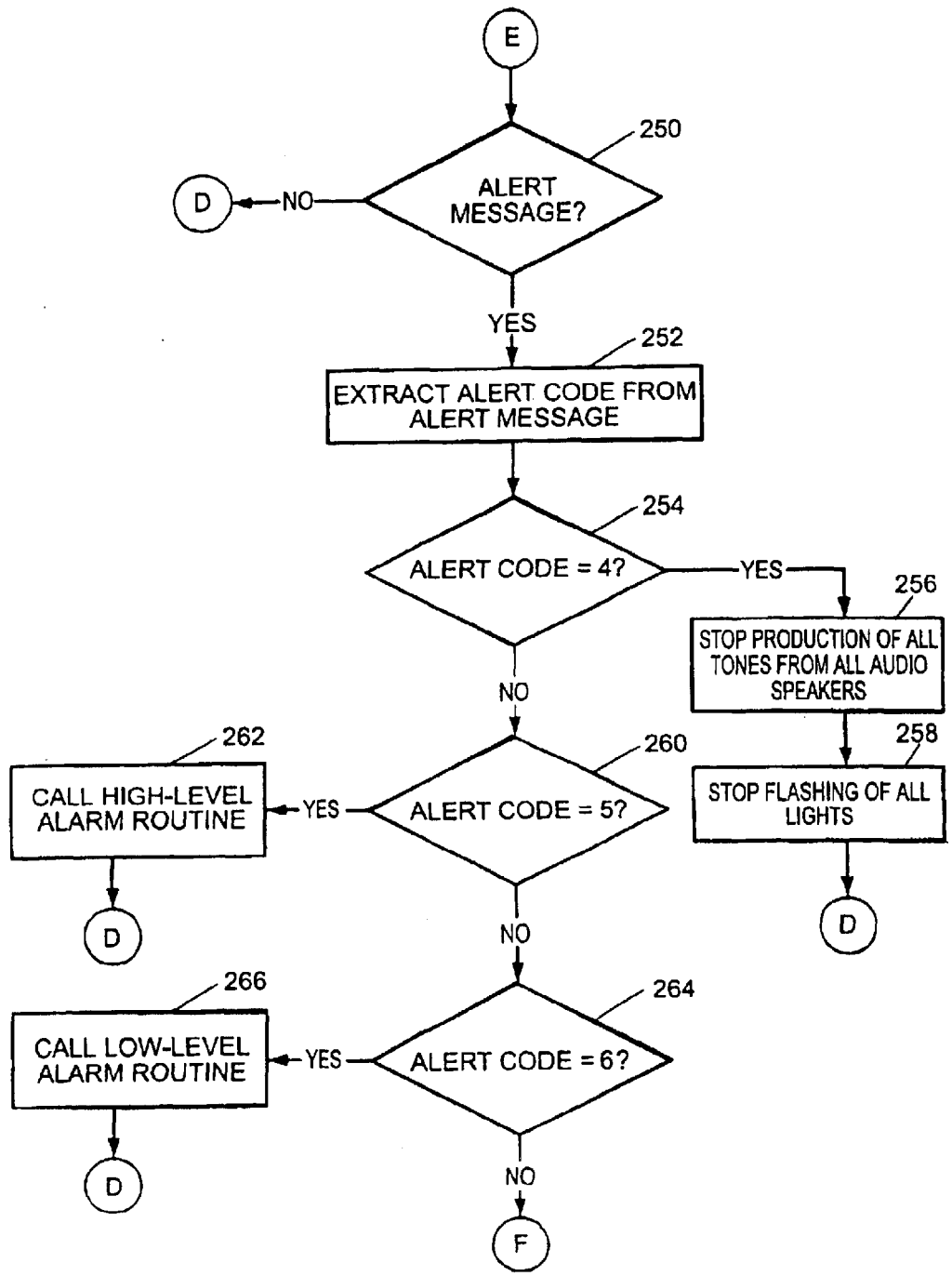
Figure 8D:
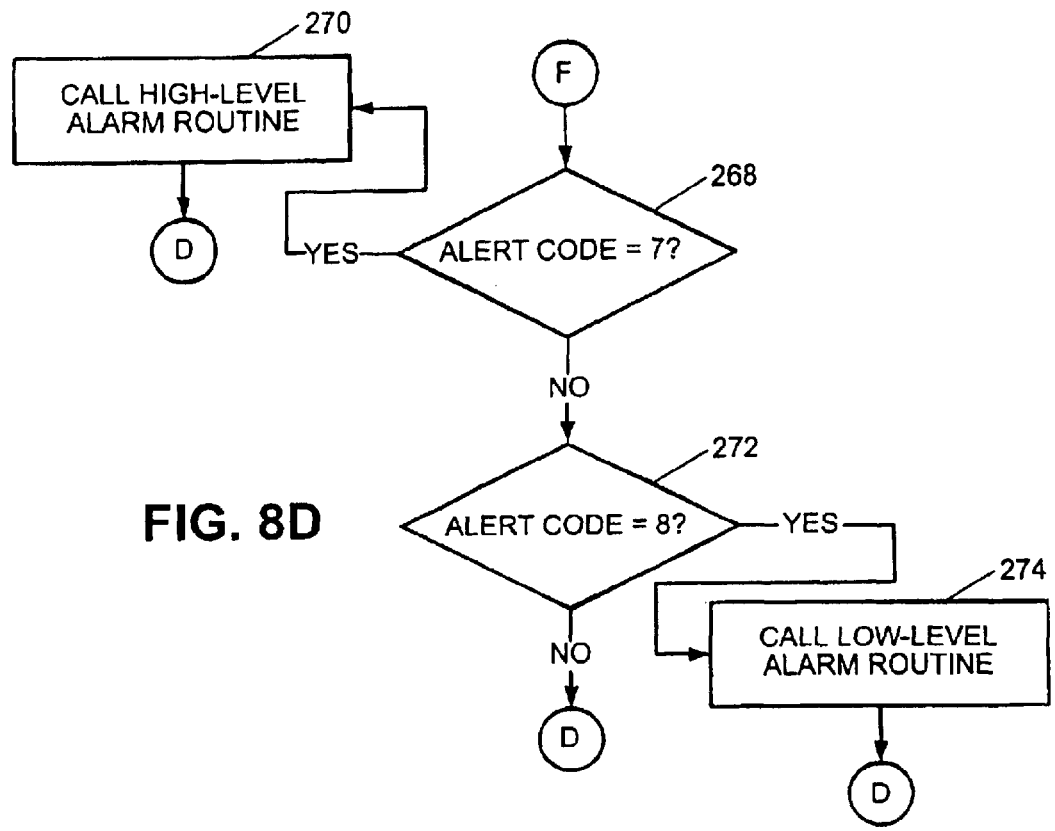

The alert messages 130 received by receiver 26 and acted upon, as described below, by the alert device 20 include, according to the preferred embodiment of the present invention, messages 130 which are encoded by the alert messaging system according to the Broadcast Short Messages System in the format of a PCS short message (illustrated by the schematic data representation of FIG. 7). Each alert message 130 includes a message header 132 indicating that the message 130 includes alert data and the general level of the alert. Preferably, the header 132 comprises eight (8) bytes of data, including a three (3) byte market code 134, a two (2) byte zone code 136, a two (2) byte alert level code 138, and a one (1) byte date stamp 140. The market code 134 includes data which identifies the regional market for which the alert message 130 is intended (i.e., the regional market includes a plurality of telecommunication transmitters 120 located in the geographical region identified by the regional market code). The zone code 136 comprises data which identifies the particular telecommunication transmitter 120 within the regional market that is to broadcast the alert message 130. Together, the market code 134 and the zone code 136 are used by the cellular, PCS, or wireless telecommunications network, as described above, for routing and communication of the alert message 130 to the telecommunications transmitter(s) 120 and geographical area 124 identified as appropriate by the alert messaging system.

The alert level code 138 of each alert message 130 includes data which identifies the severity and type of the alert condition. The EAS AM & FM Handbook, published by the Federal Communication Commission of the United States divides the alerts sent out by the Emergency Alert System ("EAS") (referred to herein as "emergency alerts") into three (3) general levels of severity. A "Level Zero" emergency alert (i.e., signified by an alert message 130 in which the alert level code 138 has a value of four (4)) indicates the existence of no emergency alert conditions and that previous emergency alerts are no longer valid or no longer in effect. A "Level One" alert (i.e., signified by an alert message 130 in which the alert level code 138 has a value of five (5)) indicates the existence, in the geographical area 124 to which the alert message 130 pertains and is communicated, of an emergency situation posing an extraordinary threat to the safety of life or property such as, but not limited to, the existence, or imminent existence, of a tornado, flood, fire, discharge of hazardous materials, industrial explosion, or nuclear incident. A "Level Two" emergency alert (i.e., signified by an alert message 130 in which the alert level code 138 has a value of six (6)) indicates the issuance of a severe weather watch or that a particular emergency condition is possible in the geographical area 124 to which the emergency alert is communicated via telecommunication transmitters 120.

According to the preferred embodiments, the alert level code 138, when appropriate, contains values other than those values described above to indicate other types of alerts and the respective severity of such other types of alerts. For instance, a "Level One" military alert (i.e., signified by an alert message 130 in which the alert level code 138 has a value of seven (7)) indicates the existence, for the geographical area 124 to which the alert message 130 pertains and is communicated, of an extremely important military alert (as an example, an alert requiring that all active duty military personnel and reservists report to their bases immediately). A "Level Two" military alert (i.e., signified by an alert message 130 in which the alert level code 138 has a value of eight (8)) indicates the existence, for the geographical area 124 to which the alert message 130 pertains and is communicated, of a less-important military alert (as an example, an alert requesting that all reservists report on Sunday instead of Saturday). It is understood that the scope of the present invention includes other types and severities of alerts having different values for alert level code 138.

Each alert message 130 further includes a text message string 142 which follows the message header 132. The text message string 142, preferably, includes a maximum of 160 ASCII text characters for display on the liquid crystal display 36a of the alert device 20 and provides more detailed information or instructions related to an alert condition. Because each alert message 130 is broadcast by one or more particular telecommunications transmitters 120 to alert devices 20 present in a specific, identifiable geographical area 124, information relevant to that geographical area 124 is includable in the text message string 142. For example and not limitation, when a tornado has been identified by meterologists as heading in a path toward, for instance, the Dunwoody, Georgia community, an alert message 130 sent and broadcast to that area includes a text message string 142 storing a message such as "TAKE IMMEDIATE COVER—A TORNADO STRIKE MAY BE IMMINENT IN THE DUNWOODY, GEORGIA AREA!". Other typical alert message text strings 142 include, for example and not limitation, messages such as "SEVERE THUNDERSTORMS WILL MOVE INTO YOUR AREA WITHIN 30 MINUTES", "FLASH FLOODS ARE POSSIBLE IN YOUR AREA", "ALL ALERTS FOR YOUR AREA HAVE LAPSED", "AN ESCAPED CONVICT IS ON THE LOOSE IN YOUR AREA—PLEASE LOCK ALL DOORS AND WINDOWS", or other relevant messages.

The alert device 20 operates, in accordance with a preferred method of the present invention, as illustrated in FIGS. 8–13. In response to a user plugging the electrical plug 34 into an electrical outlet, the alert device 20 initiates operation at step 212 where the CPU 60 of the microcomputer 24 begins to execute the instructions of the main portion 210 of the computer software program 200 residing in non-volatile program memory 64, thereby causing the alert device 20 to function as set forth in FIG. 8. After performing various initialization tasks, the CPU 60 executes, at step 214, the instructions of a self-test routine 400 (illustrated in FIG. 9) which tests the alert device's 20 ability to display messages on the liquid crystal display 36a, to produce appropriate tones on the high-level audio speaker 36b and the low-level audio speaker 36c, and to generate flashing light from the high-intensity strobe light 36d and the low-intensity light-emitting diode 36e. Upon completing execution of the instructions of the self-test routine 400, operation of the alert device 20 advances to step 216.

The CPU 60 reads from the non-volatile data memory 66, at step 216, the starting channel identifier 76 of the range of channels to be monitored, or scanned, by the receiver 26 for the presence of a digital control channel. The CPU 60 sets the test channel identifier 91 of volatile data memory 68 to the value of the starting channel identifier 76 and then sets the monitoring circuit 62 and receiver 26 to monitor, or scan, the test channel identified by the test channel identifier 91 by (i) identifying the receive frequency 82 corresponding to the test channel through performance of a table lookup operation using the test channel identifier 91 and the plurality of receive frequencies 82 stored in non-volatile data memory 66 and by (ii) communicating the looked-up receive frequency 82 to the monitoring circuit 62 via bus 74. The monitoring circuit 62 then sets the frequency to be received by the receiver 26 by communicating the receive frequency 82 to the receiver 26 via signal lines 92. The receiver 26 then commences reception of signals on the receive frequency 82 and provides output on signal lines 92 to the monitoring circuit 62, including the signal strength of the channel currently being monitored by the receiver 26.

Upon receiving output from the receiver 26, the monitoring circuit 62, at step 220, analyzes the output from the receiver 26 to determine whether a digital control channel is present on the test channel identified by the test channel identifier 91. If so, the monitoring circuit 62 so informs the CPU 60 and the CPU 60 stores the test channel identifier 91 in the plurality of channel identifiers 84 of the volatile data memory 68 at step 222. Then, at step 224, the CPU 60 reads the signal strength value 86 from the monitoring circuit 62, via bus 74, and stores the signal strength value 86 in volatile data memory 68 in association with the test channel identifier 91 stored at step 222 (i.e., as one channel identifier/signal strength pair 90 of the plurality of channel identifier/signal strength pair 90). If not, the CPU 60 determines, at step 226, whether the test channel identifier 91 equals the ending channel identifier 78. If the test channel identifier 91 does not equal the ending channel identifier 78, the CPU 60 increments the test channel identifier 91 of volatile data memory 68 by the test channel step-size 80 of non-volatile data memory 66 at step 228 and loops back to step 218 in order to set the monitoring circuit 62 and receiver 26 to monitor, or scan, the test channel identified by the incremented test channel identifier 91.

If, at step 226, the CPU 60 determines that the test channel identifier 91 equals the ending channel identifier 78, all of the channels have been monitored for the presence of a digital control channel and the CPU 60 then determines, at step 230, whether any digital control channels have been found by reviewing the table 88 of the plurality of channel identifier/signal strength pairs 90 for the presence of channel identifiers 84 and signal stength values 86. If the CPU 60 determines, at step 230, that no digital control channels have been found (i.e., that table 88 contains no channel identifiers 84 and signal strength values 86), the CPU 60 instructs, at step 232, the peripheral device controller 70 to display "NO SERVICE AVAILABLE" on the liquid crystal display 36a. The CPU 60 then loops back to step 216.

If the CPU 60 determines, at step 230, that a digital control channel has been found, the CPU 60 then, at step 236, analyzes and compares the signal strength values 86 stored in volatile data memory 68 to identify and select the digital control channel having the strongest signal strength value 86 (the digital control channel so identified being referred to herein as the "alert channel"). At step 238, the CPU 60 stores the channel identifier 84 of the alert channel as the alert channel pointer 93 in volatile data memory 68. Next, at step 240, the CPU 60 sets the monitoring circuit 62 to monitor the alert channel by retrieving the receive frequency 82 corresponding to the alert channel (referred to herein as the "alert channel receive frequency") using the alert channel pointer 93 and the plurality of receive frequencies 82 stored in non-volatile data memory 66 and by communicating the alert channel receive frequency to the monitoring circuit 62 via bus 74. The monitoring circuit 62 then sets the receiver 26 to receive signals at the alert channel receive frequency, by communicating the alert channel receive frequency to the receiver 26 through signal lines 92.

Advancing to step 242, the CPU 60 causes the graphical display of the signal strength of the alert channel by instructing the peripheral device controller 70 to energize the appropriate bars 39 of the signal strength indicator 37 of the liquid crystal display 36a. By graphically displaying the signal strength of the alert channel, the alert device 20 enables a user to move the alert device 20 to other locations (for instance, in the user's house) and to visually see any change in signal strength, thereby further enabling a user to select a location for the alert device 20 at which the alert device 20 receives the maximum possible signal strength for the alert channel. Next, at step 244, the CPU 60 instructs the peripheral device controller 70, via bus 74, to display the word "READY" in the alphanumeric portion of the liquid crystal display 36a. In response, the peripheral device controller 70 communicates an appropriate command to the liquid crystal display 36a, via signal lines 98, causing the liquid crystal display 36a to display the word "READY".

In accordance with the method of the preferred embodiment of the present invention, the monitoring circuit 62 continually monitors, at step 246, the alert channel for the presence of a broadcast short message until the monitoring circuit 62 detects a broadcast short message. Upon detection of a broadcast short message, the monitoring circuit 62 notifies the CPU 60 of the receipt of the broadcast short message at step 248 and, in response, the CPU 60 reads the header 132 of the broadcast short message. The CPU 60, at step 250, analyzes the header 132 and determines whether the broadcast short message is an alert message 130 by comparing the format and data of the received broadcast short message to the format and data values known to the CPU 60 as corresponding to an alert message 130. If the CPU 60 determines that the broadcast short message is not an alert message 130, the CPU 60 branches back to step 246 to resume monitoring of the alert channel. If the CPU 60 determines that the broadcast short message is an alert message 130, the CPU 60 identifies the alert level of the alert message 130 by extracting the alert level code 138 from the alert message 130 at step 252.

Proceeding to step 254, the CPU 60 determines whether the alert level code 138 corresponds to a "Level Zero"

emergency alert (i.e., the alert level code 138 has a value of 4). If the CPU 60 determines that the alert message 130 is a message for a "Level Zero" emergency alert, the CPU 60 communicates, at step 256, a command to the peripheral device controller 70, via bus 74, instructing the peripheral device controller 70 to stop the production of all tones from all audio speakers 36b, 36c. In response, the peripheral device controller 70 ceases the generation and supply of signals on signal lines 100, 102 in order to, respectively, terminate the production of tones from the high-level audio speaker 36b and the low-level audio speaker 36c. Then, at step 258, the CPU 60 communicates a command to the peripheral device controller 70, via bus 74, instructing the peripheral device controller 70 to stop the flashing of the high-intensity strobe light 36d and the low-intensity light-emitting diode 36e. The peripheral device controller 70, in response, ceases the generation and supply of signals on signal lines 104, 106, thereby stopping the flashing of the high-intensity strobe light 36d and the low-intensity light-emitting diode 36e. The CPU 60 then loops back to step 246 and resumes monitoring the alert channel.

If, at step 254, the CPU 60 determines that the alert level code 138 does not correspond to a "Level Zero" emergency alert, the CPU 60 determines, at step 260, whether the alert level code 138 corresponds to a "Level One" emergency alert. If so, the CPU 60 executes a call, at step 262, to the high-level alarm routine 500 and begins execution according to the high-level alarm routine 500, described below, in order to cause the production of a high-decibel level tone on the high-level audio speaker 36b and the flashing of the high-intensity strobe light 36d. Upon completion of the high-level alarm routine 500, the CPU 60 loops back to step 246 and resumes monitoring of the alert channel. If the CPU 60 determines, at step 260, that the alert level code 138 does not correspond to a "Level One" emergency alert, the CPU 60 continues operation with step 264.

At step 264, the CPU 60 determines whether the alert level code 138 corresponds to a "Level Two" emergency alert. If so, the CPU 60 executes a call, at step 266, to the low-level alarm routine 600 and begins execution in accordance with the low-level alarm routine 600, described below, in order to cause the production of a "chirping tone" on the low-level audio speaker 36c and the flashing of the low-intensity light-emitting diode 36e. Upon completion of the low-level alarm routine 600, the CPU 60 loops back to step 246 and resumes monitoring of the alert channel. If the CPU 60 determines, at step 264, that the alert level code 138 does not correspond to a "Level One" emergency alert, the CPU 60 continues operation with step 266.

The CPU 60 determines, at step 268, whether the alert level code 138 corresponds to a "Level One" military alert. If so, the CPU 60 executes a call, at step 270, to the high-level alarm routine 500 and begins execution according to the high-level alarm routine 500, described below, in order to cause the production of a high-decibel level tone on the high-level audio speaker 36b and the flashing of the high-intensity strobe light 36d. Upon completion of the high-level alarm routine 500, the CPU 60 loops back to step 246 and resumes monitoring of the alert channel. If the CPU 60 determines, at step 268, that the alert level code 138 does not correspond to a "Level One" military alert, the CPU 60 continues operation with step 272.

At step 272, the CPU 60 determines whether the alert level code 138 corresponds to a "Level Two" military alert. If so, the CPU 60 executes a call, at step 274, to the low-level alarm routine 600 and begins execution in accordance with the low-level alarm routine 600, described below, in order to cause the production of a "chirping tone" on the low-level audio speaker 36c and the flashing of the low-intensity light-emitting diode 36e. Upon completion of the low-level alarm routine 600, the CPU 60 loops back to step 246 and resumes monitoring of the alert channel. If the CPU 60 determines, at step 272, that the alert level code 138 does not correspond to a "Level One" emergency alert, the CPU 60 loops back to step 246 and resumes monitoring of the alert channel.

Figure 9A:
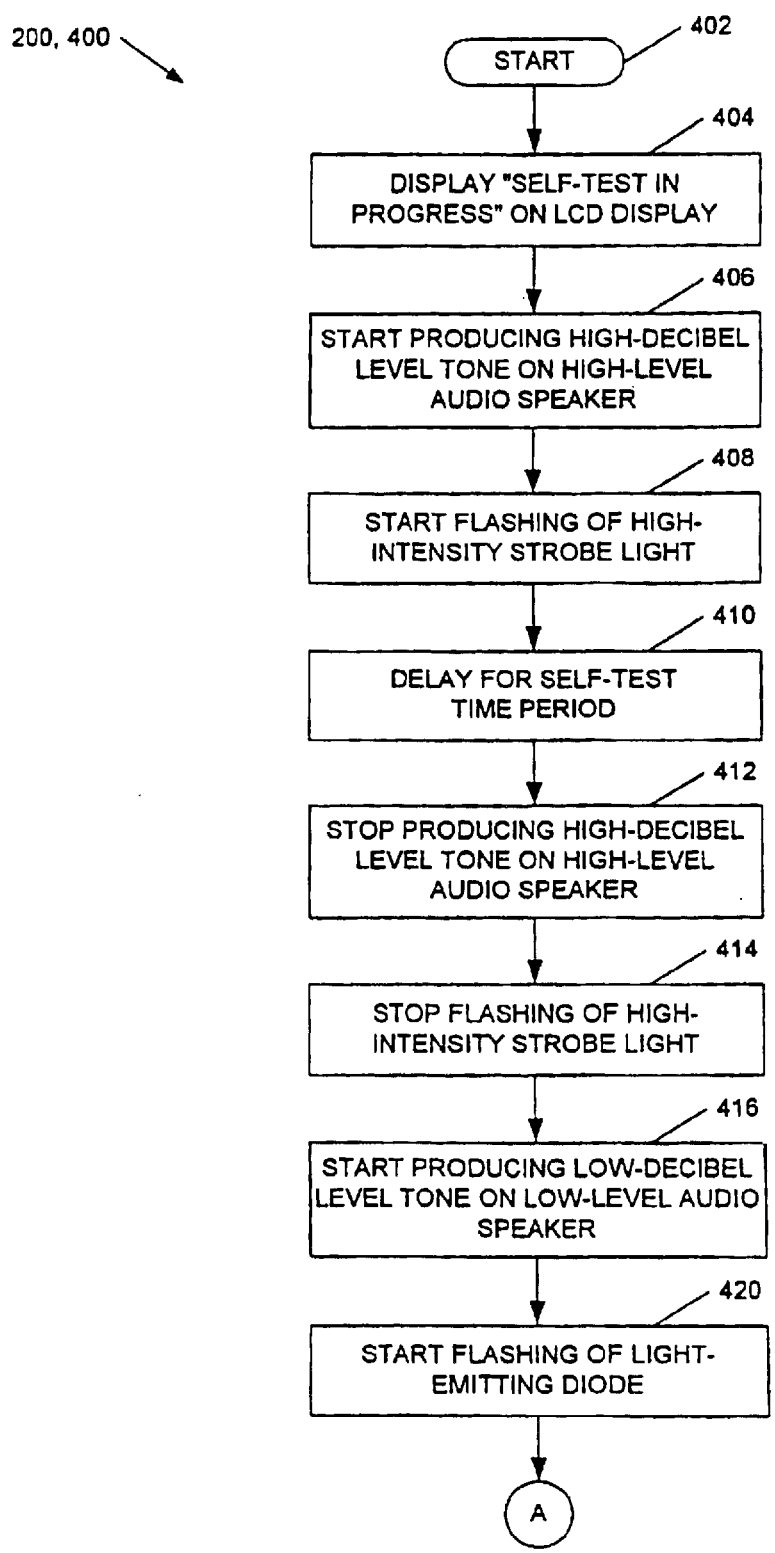
FIGS. 9a–b are flowchart representations of a self-test routine of the computer software program of the alert device in accordance with a method of the preferred embodiment of the present invention.
Figure 9B:
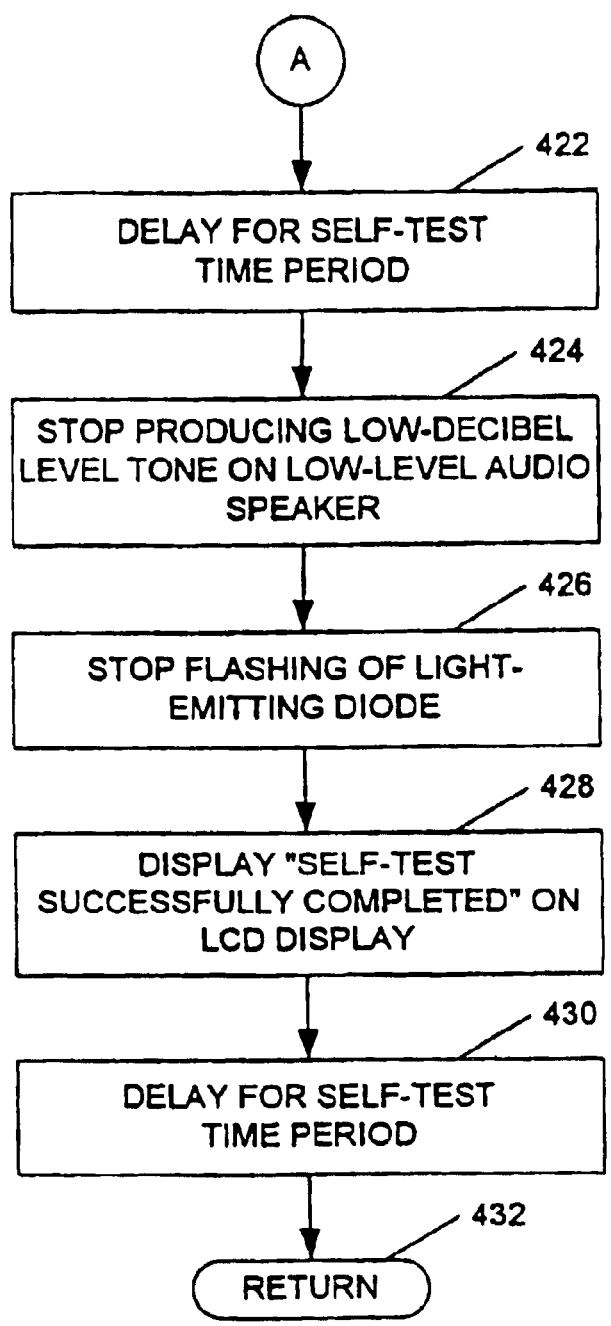

FIG. 9 displays the self-test routine 400, in accordance with the method of the preferred embodiment of the present invention, which includes steps that the CPU 60 performs when the alert device 20 calls the self-test routine 400 at step 214 of the main portion 210 of the computer software program 200. After performing initialization tasks at step 402, the CPU 60 communicates, at step 404, an instruction to the peripheral device controller 70, via bus 74, directing the peripheral device controller 70 to display the words "SELF-TEST IN PROGRESS" on the liquid crystal display 36a. The peripheral device controller 70 then communicates appropriate signals to the liquid crystal display 36a through signal lines 98. In response, the liquid crystal display 36a displays the words "SELF-TEST IN PROGRESS". Then, at steps 406 and 408, the CPU 60 communicates instructions to the peripheral device controller 70 through bus 74 which direct the peripheral device controller 70 to generate appropriate signals on signal lines 100, 104 which, respectively, cause the high-level audio speaker 36b to produce a high-decibel level tone and the high-intensity strobe light 36d to periodically flash. After delaying for the period of time stored in the self-test time period 81 of the non-volatile data memory 66 at step 410, the CPU 60 communicates commands, at steps 412 and 414, to the peripheral device controller 70 directing the peripheral device controller 70 to terminate the production of appropriate signals on respective signal lines 100, 104 and, hence, stop the high-level audio speaker 36b from generating a high-decibel level tone and the high-intensity strobe light 36d from flashing.

Continuing at step 416, the CPU 60 directs the peripheral device controller 70, by the communication of a command therebetween over bus 74, to initiate the production of a low-decibel level tone on the low-level audio speaker 36c. In response, the peripheral device controller 70 generates appropriate signals on signal lines 102 which cause the low-level audio speaker 36c to begin producing a low-decibel tone. Next, at step 420, the CPU 60 sends an instruction to the peripheral device controller 70, via bus 74, instructing the peripheral device controller 70 to begin flashing of the low-intensity light-emitting diode 36e. The peripheral device controller 70, in response, generates appropriate signals on signal lines 106 which cause the low-intensity light-emitting diode 36e to flash periodically. Upon delaying, at step 422 for a period of time equaling the self-test timer period 81 stored in non-volatile data memory 66, the CPU 60 communicates commands to the peripheral device controller 70 over bus 74, at steps 424 and 426, which direct the peripheral device controller 70 to stop the production of the low-decibel level tone and flashing light. Responsive to the commands, the peripheral device controller 70 terminates the production of signals on respective signal lines 102, 106, thereby stopping the generation of the low-decibel level tone from the low-level audio speaker 36c and the flashing of the low-intensity light-emitting diode 36e.

The CPU 60, at step 428, transmits an instruction over bus 74 to the peripheral device controller 70 directing the peripheral device controller 70 to cause the display of the words "SELF-TEST SUCCESSFULLY COMPLETED" on the liquid crystal display 36a. The peripheral device controller 70 then generates appropriate signals on signal lines 98, including signals representing the words "SELF-TEST SUCCESSFULLY COMPLETED", to cause those words to appear on the liquid crystal display 36a. In response, the liquid crystal display 36a displays the words "SELF-TEST SUCCESSFULLY COMPLETED". Next, the CPU 60 delays, at step 430, for a period of time corresponding to the self-test time period 81 stored in the non-volatile data memory 66 before returning, at step 432, to the execution in accordance with the main portion 210 of the computer software program 200.

Figure 10:
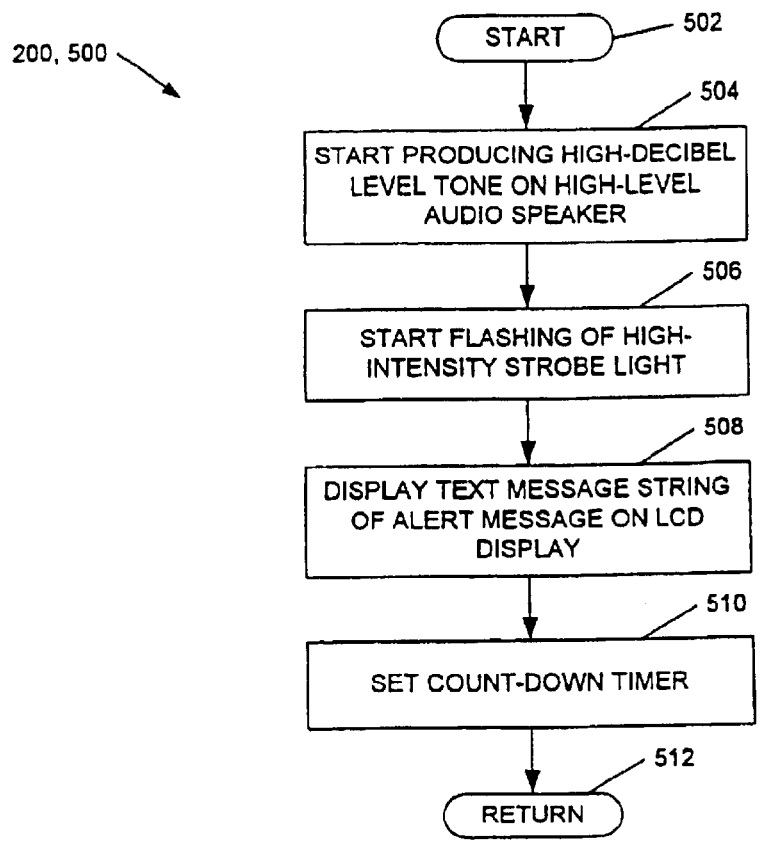
FIG. 10 is a flowchart representation of a high-level alarm routine of the computer software program of the alert device in accordance with a method of the preferred embodiment of the present invention.

FIG. 10 displays the high-level alarm routine 500, in accordance with the method of the preferred embodiment of the present invention, which includes steps that the CPU 60 performs when the alert device 20 calls the high-level alarm routine 500 at steps 262 and 270 of the main portion 210 of the computer software program 200. After performing various initialization tasks at step 502, the CPU 60 communicates a command, at step 504 and via bus 74, to the peripheral device controller 70 instructing the peripheral device controller 70 to start producing a high-decibel level tone on the high-level audio speaker 36b. In response, the peripheral device controller 70 generates and supplies, through signal lines 100, appropriate signals to the high-level audio speaker 36b, thereby causing the high-level audio speaker 36b to produce a continuous high-decibel level tone. In an alternate method of the present invention, the peripheral device controller 70 causes the high-level audio speaker 36b to produce non-continuous, high-decibel level tones.

At step 506, the CPU 60 similarly communicates a command, via bus 74, to the peripheral device controller 70 instructing the peripheral device controller 70 to start flashing the high-intensity strobe light 36d. The peripheral device controller 70, in response, produces and supplies appropriate signals, via signal lines 104, to the high-intensity strobe light 36d, thereby causing the high-intensity strobe light 36d to flash at a periodic rate. In an alternate method of the present invention, the peripheral device controller 70 causes the high-intensity strobe light 36d to flash in a non-periodic manner.

Continuing at step 508, the CPU 60 extracts the text message string 142 from the alert message 130 and communicates the extracted text message string 142 (and a command to display the extracted text message string 142) to the peripheral device controller 70 via bus 74. The peripheral device controller 70 then communicates appropriate signals, including the extracted text message string 142, to the liquid crystal display 36a through signal lines 98 in order to cause the extracted text message string 142 to appear on the liquid crystal display 36a. Upon display of the extracted text message string 142 on the liquid crystal display 36a, the CPU 60 sets, at step 510, the count-down timer 72 by sending appropriate instructions to the count-down timer 72 via bus 74, to begin counting down for, according to the preferred embodiments, a period of two (2) hours during which the extracted text message string 142 remains displayed on the liquid crystal display 36a. Then, at step 512, the CPU 60 resumes execution in accordance with the main portion 210 of the computer software program 200 after the step which called for execution of the steps of the high-level alarm routine 500.

FIG. 11 displays the low-level alarm routine 600, in accordance with the method of the preferred embodiment of the present invention, which includes steps that the CPU 60 performs when the alert device 20 calls the low-level alarm routine 600 at steps 266 and 274 of the main portion 210 of the computer software program 200. After performing various initialization tasks at step 602, the CPU 60 communicates a command, at step 604 and via bus 74, to the peripheral device controller 70 instructing the peripheral device controller 70 to start producing a low-decibel "chirping" tone on the low-level audio speaker 36c. In response, the peripheral device controller 70 generates and supplies, through signal lines 102, appropriate signals to the low-level audio speaker 36c, thereby causing the low-level audio speaker 36c to produce a "chirping" low-decibel level tone. In an alternate method of the present invention, the peripheral device controller 70 causes the low-level audio speaker 36c to produce continuous, low-decibel level tone.

At step 606, the CPU 60 similarly communicates a command, via bus 74, to the peripheral device controller 70 instructing the peripheral device controller 70 to start flashing the low-intensity light-emitting diode 36e. The peripheral device controller 70, in response, produces and supplies appropriate signals, via signal lines 106, to the low-intensity light-emitting diode 36e, thereby causing the low-intensity light-emitting diode 36e to flash at a periodic rate. In an alternate method of the present invention, the peripheral device controller 70 causes the low-intensity light-emitting diode 36e to flash in a non-periodic manner.

Continuing at step 608, the CPU 60 extracts the text message string 142 from the alert message 130 and communicates the extracted text message string 142 (and a command to display the extracted text message string 142) to the peripheral device controller 70 via bus 74. The peripheral device controller 70 then communicates appropriate signals, including the extracted text message string 142, to the liquid crystal display 36a through signal lines 98 in order to cause the extracted text message string 142 to appear on the liquid crystal display 36a. Upon display of the extracted text message string 142 on the liquid crystal display 36a, the CPU 60 sets, at step 610, the count-down timer 72 by sending appropriate instructions to the count-down timer 72 via bus 74, to begin counting down for, according to the preferred embodiments, a period of two (2) hours during which the extracted text message string 142 remains displayed on the liquid crystal display 36a. Then, at step 612, the CPU 60 resumes execution in accordance with the main portion 210 of the computer software program 200 after the step which called for execution of the steps of the low-level alarm routine 600.

Figure 12:
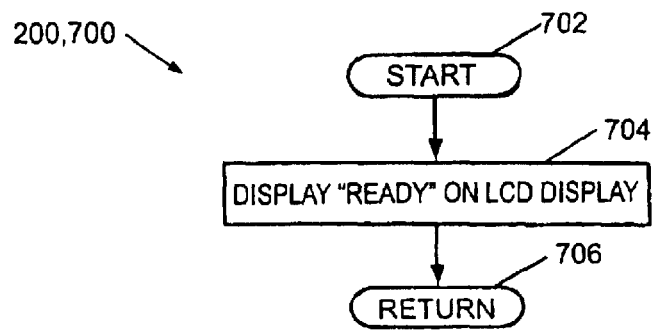
FIG. 12 is a flowchart representation of a timer interrupt handling routine of the computer software program of the alert device in accordance with a method of the preferred embodiment of the present invention.

FIG. 12 displays the timer interrupt handling routine 700, in accordance with the method of the preferred embodiment of the present invention, which includes steps that the CPU 60 performs when the count-down timer 72 completes counting down to zero and provides an asynchronous interrupt signal to the CPU 60 via bus 74. After performing various initialization tasks at step 702, the CPU 60 communicates a command, at step 704 and via bus 74, to the peripheral device controller 70 instructing the peripheral device controller 70 to clear the liquid crystal display 36a and then display the word "READY" on the liquid crystal display 36a. The peripheral device controller 70 then communicates appropriate signals, including the word "READY", to the liquid crystal display 36a through signal lines 98 in order to cause erasure of all text present on the liquid crystal display 36a and to cause the word "READY" to appear on the liquid crystal display 36a. In response, the liquid crystal display 36a erases all text and then displays the word "READY". The CPU 60, at step 706, resumes execution in accordance with the main portion 210 of the computer software program 200.

Figure 13:
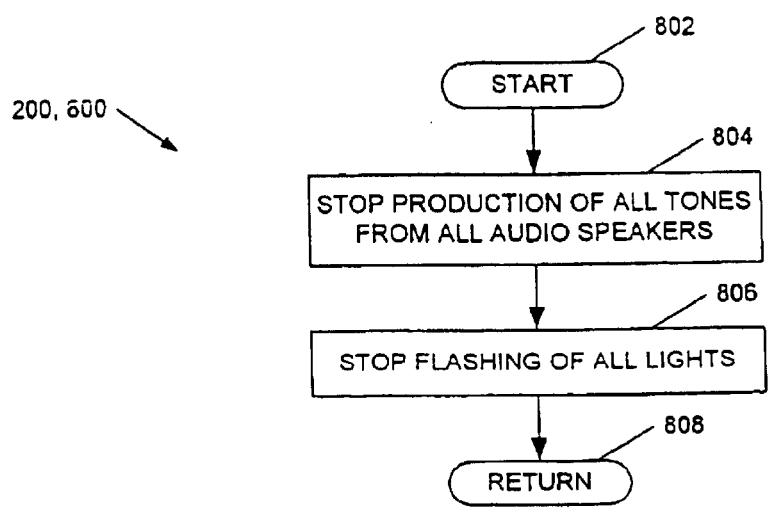
FIG. 13 is a flowchart representation of a reset interrupt handling routine of the computer software program of the alert device in accordance with a method of the preferred embodiment of the present invention.

FIG. 13 displays the reset interrupt handling routine 800, in accordance with the method of the preferred embodiment of the present invention, which includes steps that the CPU 60 performs when the reset pushbutton 36f is depressed by a user (i.e., to stop the generation of all sounds and all flashing light) and the peripheral device controller 70, in response, provides an asynchronous interrupt signal to the CPU 60 via bus 74. After performing various initialization tasks at step 802, the CPU 60 communicates, at step 804, a command to the peripheral device controller 70, via bus 74, instructing the peripheral device controller 70 to stop the production of all tones from all audio speakers 36b, 36c. In response, the peripheral device controller 70 ceases the generation and supply of signals on signal lines 100, 102 in order to terminate the production of tones from the high-level audio speaker 36b and the low-level audio speaker 36c. Then, at step 806, the CPU 60 communicates a command to the peripheral device controller 70, via bus 74, instructing the peripheral device controller 70 to stop the flashing of the high-intensity strobe light 36d and the low-intensity light-emitting diode 36e. The peripheral device controller 70, in response, ceases the generation and supply of signals on signal lines 104, 106, thereby stopping the flashing of the high-intensity strobe light 36d and the low-intensity light-emitting diode 36e. After stopping the generation of all flashing light, the CPU 60, at step 808, resumes execution in accordance with the main portion 210 of the computer software program 200.

It is understood that the term "PCS", as used herein, refers to any short-range, geographically-distributed broadcast system similar to those commonly used in cellular or PCS mobile telecommunication networks and the like. It is also understood that the scope of the present invention includes alert devices which operate with other digital wireless telecommunication networks and which receive broadcast messages which are formatted and transmitted using formats, protocols, geographical identifiers, and severity indicators other than that defined by the Broadcast Short Messages System or by the EAS AM & FM Handbook.

Figure 14:
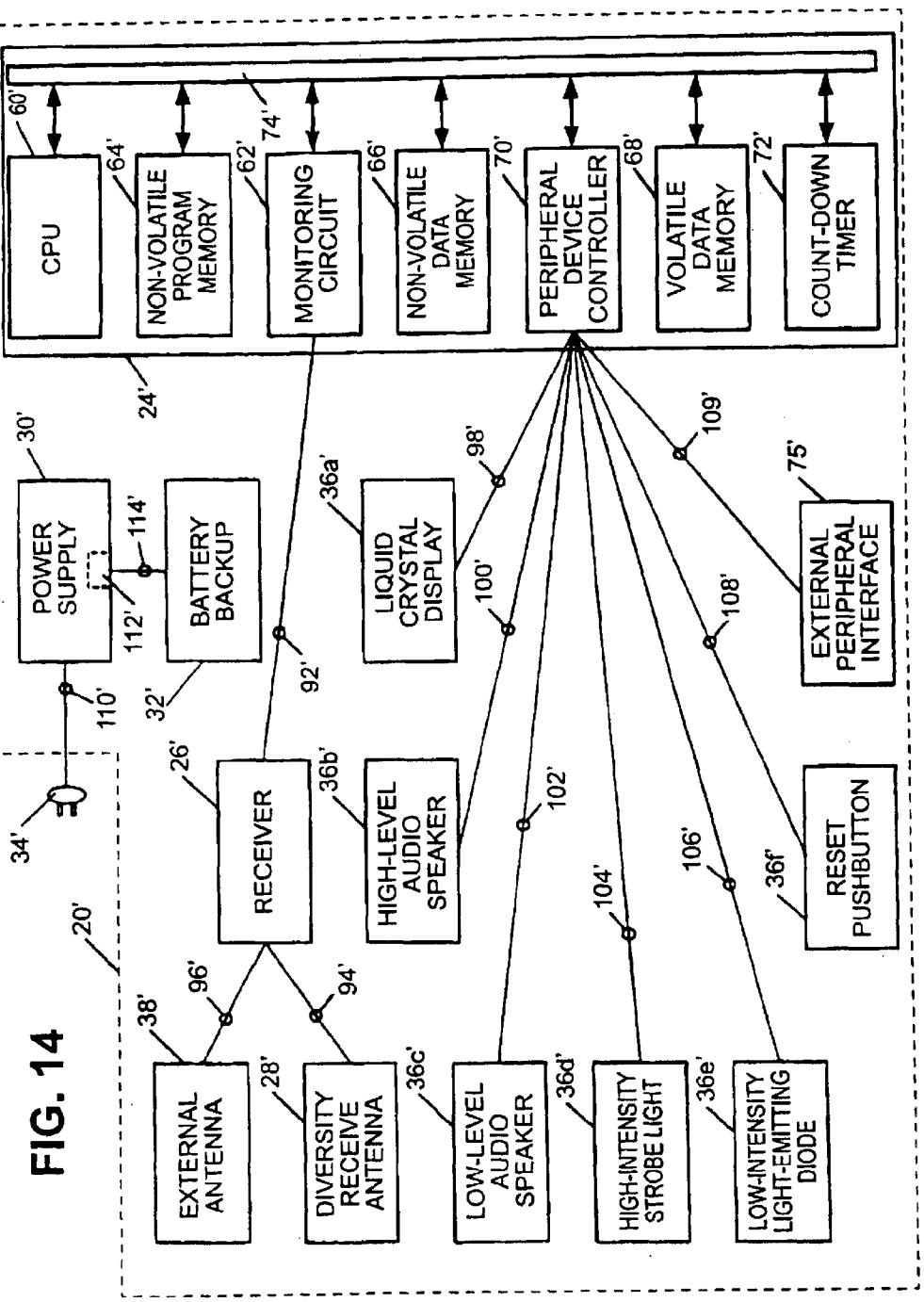
FIG. 14 is a block diagram representation of a first portion of an alert device of a first alternate preferred embodiment displaying the major components thereof.

FIG. 14 displays an alert device 20', in accordance with an apparatus of a first alternate preferred embodiment of the present invention, for use at installations where audible tones and flashing light must be delivered to persons located remotely from the site of the alert device 20'. The alert device 20' is substantially similar to the alert device of the preferred embodiment, except that the alert device 20' further comprises an external peripheral interface 75' which connects to the peripheral device controller 70' and to pluralities of remote peripheral devices 37a', 37b', 37c' (see FIG. 15). Each plurality of remote peripheral devices 37' comprises a remotely-located liquid crystal display 36aa', a remotely-located high-level audio speaker 36bb', a remotely-located low-level audio speaker 36cc', a remotely-located high-intensity strobe light 36dd', a remotely-located low-intensity light-emitting diode 36ee', and a remotely-located reset pushbutton 36ff' which connect to the external peripheral interface 75' via respective signal lines 99', 101', 103', 105', 107', 111'.

Figure 15:
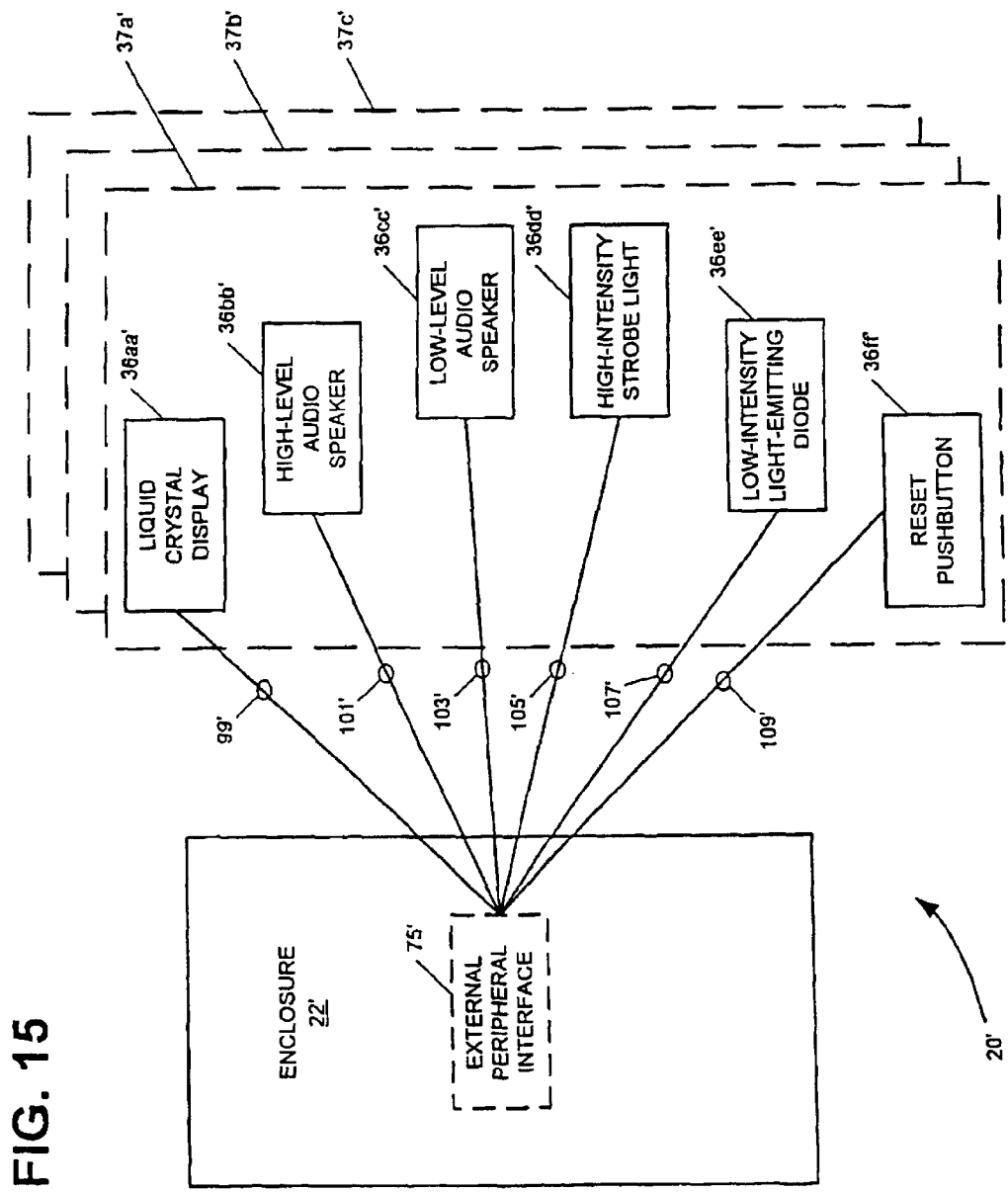
FIG. 15 is a block diagram representation of the first portion of the alert device of FIG. 14 and a plurality of remotely-located peripheral devices of a second portion of the alert device.

According to the first alternate preferred embodiment of the present invention, the apparatus of the first alternate preferred embodiment, displayed in FIGS. 14 and 15, operates in accordance with a method of the first alternate preferred embodiment which is substantially similar to the method of the preferred embodiment, except that when tones, flashing light and textual displays are produced by the plurality of peripheral devices 36' located within or protruding from the enclosure 22' of the alert device 20', tones, flashing light and textual displays are also simultaneously produced from all of the peripheral devices of the pluralities of remote peripheral devices 37a', 37b', 37c' in response to signals produced on signal lines 109' by the peripheral device controller 70' and communicated by the external peripheral interface 75' to the pluralities of remote peripheral devices 37a', 37b', 37c'. Similarly, when termination of the tones, flashing light and display of textual information produced by the plurality of peripheral devices 36' located within or protruding from the enclosure 22' of the alert device 20' occurs, termination of the tones, flashing light and display of textual information simultaneously occurs with respect to the pluralities of remote peripheral devices 37a', 37b', 37c'in response to signals produced on signal lines 109' by the peripheral device controller 70' and communicated by the external peripheral interface 75 to the pluralities of remote peripheral devices 37a', 37b', 37c'.

According to a second alternate preferred embodiment of the present invention, the alert device 20" may be adapted for use in a system wherein a service provider provides alert messages to subscribers (i.e., users) having alert devices and charges the users a periodic subscription fee. Specifically, alert device 20" supports operation at two or more service levels or modes that reflect and correspond to the subscription status of the user. The alert device 20", preferably, includes a default service level that is preprogrammed at the factory and which is later subject to modification in response to control signals received from an alert messaging system. This allows the service provider to remotely control and/or set the service level of a user's alert device 20" to coincide with the service level paid for by the user.

For example and not limitation, a service provider's alert messaging system may send an alert message, including a service level data field, which is received and interpreted by an alert device 20". The service level data field may be set to any of the following levels: (1) fully enabled; (2) partially enabled; or, (3) fully disabled. In the fully enabled mode, alert device 20" reacts to all alert messages and provides the user with any received information. In the partially enabled mode, alert device 20" only reacts to the most severe alerts (i.e., "Level One" alerts) to provide the user with a minimal level of service, warnings, and protection. In the fully disabled mode, alert device 20" will not react to any alert messages.

Preferably, a default service level is stored in a memory of each alert device 20" during manufacture of the alert device 20". For purposes of requiring subscription, the default service level is ideally set to the fully disabled level. As a consequence, a user must contact a service provider and establish a subscription to the service provider's notification or alert messaging service in order for the user's alert device 20" to react to alert messages as desired by the user. However, it may be desirable to set the default service level to a different service level for reasons of liability or to improve customer relations. For example, the default level might be set to the partially enabled level to ensure that even non-subscriber users are provided with critical information relating to high level emergencies (i.e., "Level Once" alerts), thereby reducing the manufacturer's liability. Alternatively, the default level might be set to the fully enabled level for a set period of time after initial activation, during which time the user's alert device 20" would operate at the full service level as an inducement to encourage the user to subscribe at the full service level.

Figure 16:
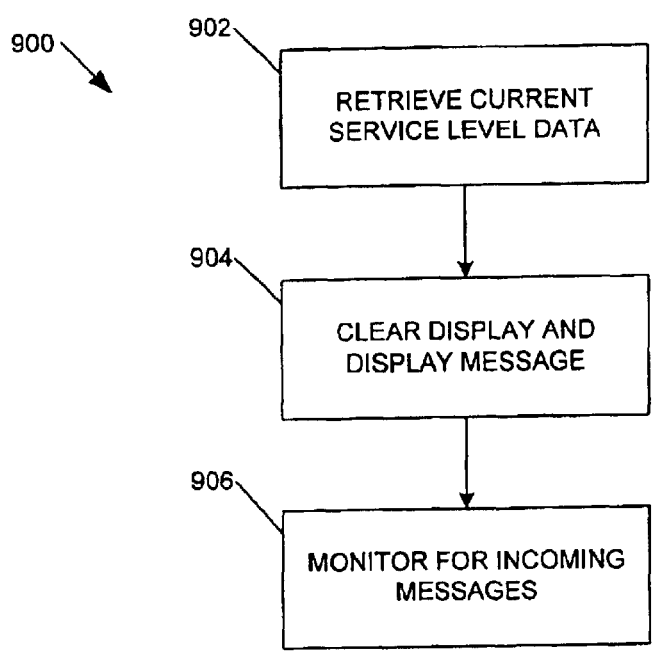
FIG. 16 is a flowchart representation of a startup service level check routine of a computer software program of an alert device in accordance with the method of a second alternate preferred embodiment of the present invention.

FIG. 16 displays a startup service level check routine 900, in accordance with the method of the second alternate preferred embodiment of the present invention. At step 902, CPU 60" retrieves current service level data from non-volatile memory 66", which has previously been set during manufacture or modified remotely by the receipt of an updated service level from a service provider. After performing other startup tasks heretofore discussed, CPU 60" communicates a command, at step 904 and via bus 74" to the peripheral device controller 70", instructing the peripheral device controller 70" to clear the liquid crystal display 36a" and then display an appropriate message. For example, if the service level is currently set to fully enabled, the displayed message may be "UNIT FULLY FUNCTIONAL"; if the service level is set to partially disabled, the displayed message is "PLEASE CONTACT SERVICE PROVIDER— MESSAGE 1", the low-intensity light-emitting diode 36e is made to flash, and the low-level audio speaker 36c is made to produce a "chirping" low-decibel level tone; and if the service level is set to Fully Disabled the displayed message is "PLEASE CONTACT SERVICE PROVIDER — MESSAGE 2", the high-intensity strobe light 36d is made to flash, and the high-level audio speaker 36b is made to produce a continuous high-decibel level tone. CPU 60" then proceeds to step 906 and monitors for incoming messages as previously discussed in relation to FIGS. 8–13.

In order to alter the service level of a particular alert device 20", it is necessary to provide a mechanism wherein each individual alert device 20" may be individually identified and or selected from all other alert devices 20". According to the second alternate preferred embodiment, such identification or selection is accomplished by assigning each alert device 20" a unique electronic serial number (ESN) that is stored in non-volatile memory 66". The ESN is, preferably, either an 8 digit hexadecimal number or an 11 digit decimal number. The leading digits of the number (i.e., the first two for hexadecimal and the first three for decimal) indicate (i.e. uniquely identify) the manufacturer of the alert device 20". The remaining digits are a unique sequence of digits for each device, whereby each device of the manufacturer is uniquely identified.

In operation, the alert messaging system generates alert messages, as appropriate (i.e., when one or more subscribers change their subscription(s) to subscribe to a different service level than is currently in effect at their respective alert devices 20"), instructing each appropriate alert device 20" to alter its service level. Preferably, service level alteration messages are identified by assigning a separate set of alert levels in the message header that correspond to the selected service level to which the identified devices are to be set. In the standard short message format, each service level alert message may include up to seventeen ESN's in the body of the message, thus allowing up to seventeen units to have their service levels adjusted by a single broadcast of a short message. It is understood that the scope of the present invention comprises all apparatus and methods for communicating and setting the service level of an alert device 20".

Figure 17:
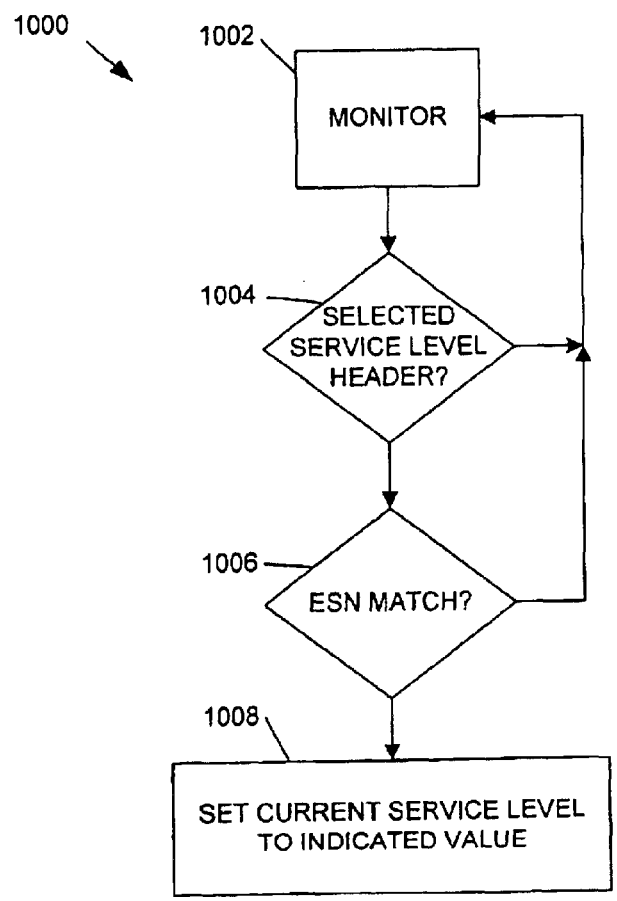
FIG. 17 is a flowchart representation of a service level adjustment routine of the computer software program of an alert device in accordance with the method of the second alternate preferred embodiment of the present invention.

A service level adjustment routine 1000 is illustrated in FIG. 17 in accordance with the second alternate preferred embodiment of the present invention. At step 1002, alert device 20" monitors the selected frequency for a message generated by the alert messaging system. Upon receipt of an alert message, CPU 60" of alert device 20" proceeds to step 1004 and examines the message to determine whether the message header includes an alert level corresponding to (i.e., identifying the message as) a service level adjustment message. If the message header does not include an alert level corresponding to a service level adjustment message, CPU 60" then ignores the message and returns to step 1002 to continue monitoring for alert messages.

If the message header includes an alert level corresponding to a service level adjustment message, CPU 60" then proceeds to scan the message body at step 1006 searching for an ESN that matches the ESN of the alert device 20" as stored in the device's non-volatile memory 66". If the ESN of the alert device 20" is not found in the body of the message, CPU 60" then returns to step 1002 and continues to monitor for additional messages. If, alternatively, the ESN of the device is found in the body of the message, CPU 60" proceeds to step 1008 and sets the value of the service level data stored in non-volatile memory 66" to match the service level encoded in the message header. CPU 60" then returns to step 1002 and continues to monitor for additional messages.

Figure 18:
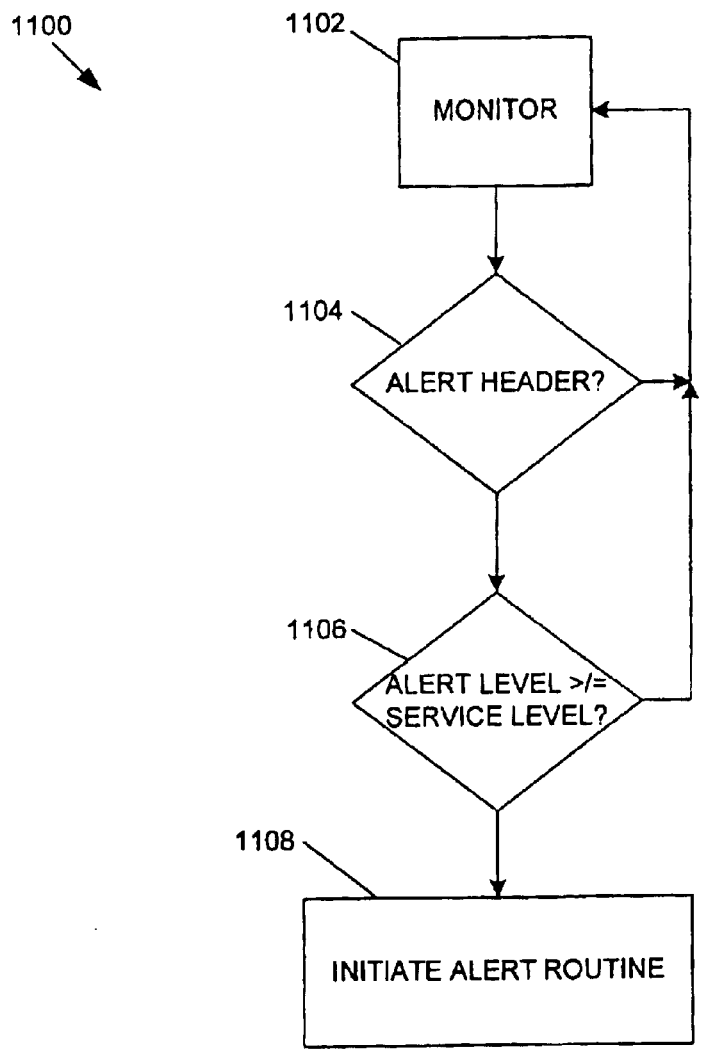
FIG. 18 is a flowchart representation of a service level authentication routine of the computer software program of an alert device in accordance with the method of the second alternate preferred embodiment of the present invention.

FIG. 18 illustrates a service level authentication routine 1100 wherein CPU 60" operates according to a received service level. At step 1102, CPU 60" monitors for an alert message as previously described in relation to FIGS. 8–13. Upon receipt of an alert message, CPU 60" proceeds to step 1104 and determines whether the alert message includes a header including alert level information. If no alert level information is included in the message header, CPU 60" returns to step 1102 and resumes monitoring for broadcast alert messages. If alert level information is included in the message header, CPU 60" then proceeds to step 1106 and compares the included alert level to the service level stored in non-volatile memory 66". If the included alert level is numerically equal to or greater than the stored service level, CPU 60" then proceeds to step 1108 and initiates the appropriate alert routine as previously described in relation to FIG. 10 or FIG. 11. If the included alert level is numerically less than the stored service level, CPU 60" ignores the alert message and returns to step 1102 to resume monitoring for additional alert messages.

In a third alternate preferred embodiment of the present invention, the alert device 20''' may be configured to support an additional alert level to be utilized for the reception of advertising messages for display on liquid crystal display 36a'''. This allows a service provider to offer a variety of additional billing and service plan options. For example, the service provider may allow full-rate subscriptions that do not provide advertising, or alternatively may offer reduced rate subscriptions that require that the alert device 20''' occasionally display advertising messages. In the latter case, the advertising revenue may offset a portion of the reduction in subscription fees.

In a system supporting advertising, upon receipt of an alert message, CPU 60''' also examines the message header as previously described in relation to FIG. 18. If the message header includes an alert level corresponding to an advertising alert (i.e., indicating that the message is an advertising alert message), CPU 60''' then communicates a command via bus 74''' to the peripheral device controller 70''', instructing the peripheral device controller 70''' to clear the liquid crystal display 36a''' and then to display thereon advertising text included in the message's body.

The present invention also operates to provide remote provisioning of the alert device 20 for preferred system providers. Each alert device 20 may maintain a preferred provider list. The preferred provider list is a list of acceptable service providers with each provider being a Public Land Mobile Network (PLMN) or other telecommunication provider. The preferred system provider list can be set at time of manufacturer of the alert device 20. Subsequently, once the alert device 20 is deployed, the preferred provider list can be updated by receiving messages sent to the individual alert device 20 or through a broadcast message receivable by multiple alert devices 20. In one embodiment, when the alert device 20 detects a control channel, the PLMN value on this control channel is compared to those in the preferred provider list. If there is a match, this control channel is suitable for this device. The opcodes listed below in Table 1 indicate another embodiment that can be used to deliver preferred system provider updates, and other control measures to the alert device 20. Thus, if updates are received, they will be added to the internal preferred system provider list, which can be stored in non-volatile memory. Alternatively, the new additions can be stored in volatile memory and thus be cleared upon resetting or removing power from the alert device 20. In either case, the revised preferred system provider list can be used in subsequent scans.

The present invention also operates to provide remote provisioning of the alert device 20 for Closed User Groups (CUG). Each alert device 20 may maintain a CUG list. The CUG list can be set at time of manufacturer of the alert device 20. Subsequently, once the alert device 20 is deployed, the CUG list can be updated by receiving messages sent to the individual alert device 20 or through a broadcast message receivable by multiple alert devices 20. Thus, the alert device 20 can receive over the air updates to its CUG list. The opcodes listed below in Table 1 indicate one embodiment that can be used to deliver CUG updates, and other control measures to the alert device 20. If updates are received they will be added to its internal list and stored in non-volatile memory or volatile memory. The revised CUG list can be used when checking subsequent messages.

In one embodiment, the alert device 20 is a receive-only device that monitors the control channel of GSM cellular networks. The alert device 20 will react to two types of cell broadcast messages; general alerts and CUG alerts. General alerts are for all reception by all alert devices 20 that are within the range of the broadcast message. CUG alerts are only for those alert devices 20 that have a matching CUG ID in its internal list of CUGs.

The present invention also operates to provide the ability to display custom standby messages (such as DHS alert level) on the alert device 20. Each broadcast message destined for an alert device 20 will include the following fields in the header: alert level and message ID. In one embodiment, the alert level is an eight-bit value and is sent in the Serial Number portion of the message. The eight-bit value will correspond to the message code. This is used to differentiate between different levels of alerts and therefore trigger different actions in the alert device 20. This information can also be thought of as an opcode, such that based on the value of this opcode, the remaining contents of the message will be interpreted accordingly.

In addition, the message ID is a four-bit value and is also sent in the Serial Number potion of the message. The message ID is used to identify the message, such that if the message is received multiple times, the alert device 20 is able to determine that the message is a duplicate.

As an exemplary embodiment, Table 1 provides one typical assignment of opcode values.

TABLE 1

| Opcodes | Alert Level | Definition Of Alert Level |
| --- | --- | --- |
| 0x00 | Level 0 Alert | Resets unit alerts. Displays text based upon provisioning indicator. |
| 0x01 | Level 1 Alert | Causes unit to illuminate strobe, and high decibel alarm. Display shows body text of message received. |
| 0x02 | Level 2 Alert | Causes unit to flash LED, and low decibel alarm. Display shows body text of message received. |
| 0x03 | Level 3 Alert | Display shows body text of message received, no audio but alert LED illuminated. |
| 0x81 | Provisioning 1 | Fully Enabled - sets provisioning indicator to value of 1. Unit is capable of receiving and reacting to all alert levels. |
| 0x82 | Provisioning 2 | Partially Disabled - sets provisioning indicator to value of 2. Unit is capable of receiving and reacting only to level 0 or level 1 messages. |
| 0x83 | Provisioning 3 | Fully Disabled - sets provisioning indicator to value of 3. Unit is capable of receiving and but not reacting to level 1,2, or three alerts. The unit is capable of receiving and reacting to provisioning messages. |
| 0xB0 | Preferred System List Update | Update the preferred system list with the following system IDs |
| 0xC0 | CUG Message Cancel | Cancels a previously sent CUG message |
| 0xC1 | CUG Update | If the alert device's serial number is contained in the following list, update the CUG information to include the alert device's receiver in the specified CUG |
| 0xC2 | Remove CUG | If the alert device's serial number is contained in the following list of serial numbers, the CUG indicated in this message should be removed from the alert device's list of CUGs |
| 0xC8 | CUG Message | The message contained in this transmission should only be displayed on alert devices containing the CUG specified by the message. |
| 0xCA | Cancel Global CUG | If this message is received by an EARs device which contains the CUG specified by the message, the EARs device should remove the CUG from it's list. |
| 0xF0 | ESN Specific Message | Only the alert device with the listed ESN should act upon this message. |
| 0xFA | Additional opcode contained in message fields | This Alert Level is used to indicate that the first byte of the message is actually an opcode that is to be used for further message processing. This is being done as a mechanism to include additional functionality that is not being considered at this time. |
| 0xFB | Reserved | These bits are reserved for future use |
| 0xFC | Reserved | These bits are reserved for future use |
| 0xFD | Reserved | These bits are reserved for future use |
| 0xFE | Reserved | These bits are reserved for future use |
| 0xFF | Reserved | These bits are reserved for future use |

The current level of provisioning is stored within the alert device 20. The alert device 20 will react to alert messages in a manner dependent upon the provisioning level. The provisioning level can be set at the time of manufacturer and can be updated over the air during operation by a cell broadcast message. The opcodes in Table 1 provide one embodiment for updating the provisioning level over the air.

The present invention also operates to provide remote provisioning of custom stand by messages. In one embodiment of this aspect of the invention, a special opcode can be used to indicate that a certain number of subsequent messages will contain a custom message to be loaded into the device and an alert level or event to which the device should be associated with. Thus, the alert device 20 can receive custom standby messages over the air. These standby messages can be stored in the memory of the alert device 20 for subsequent use. In another embodiment, the alert device can be programmed at the factory with a variety of additional messages, with only a subset of these messages being enabled. Subsequently, messages can be sent to the alert device 20 to enable and disable certain messages. In another embodiment, the alert device 20 can be programmed with a vocabulary. During operation, messages that identify certain words from the vocabulary can be sent to the alert device 20 to create custom standby messages.

The present invention also operates to provide the ability to signal an external device such as mattress shaker. In one embodiment of the invention, this capability is provided by an output signal from the alert device 20 that can be used to control the operation of an external device. The external device can include type of external alerting device, or some other external device that can be controlled to provide alert signaling or perform other tasks. One such device can be a vibrator that is either embedded within a mattress or place underneath the mattress. When the appropriate level of alarm is received, the external device can be actuated. In this example, the mattress of a bed can be caused to vibrate, thereby alerting a sleeping user.

The present invention also operates to provide ability to send messages to a single device (for troubleshooting purposes). In one embodiment, this accomplished by sending a message that is intended only for a specific alert device 20. Each alert device 20 has a unique serial number (i.e., an electronic serial number or ESN). Using the 0xF0 opcode listed in Table 1, a message can be sent to a specific an alert device 20 having a specific serial number. Thus, all alert devices 20 that do not have that serial number, which incidentally will be all of the rest of the alert devices 20, will not react to the message. Using this technique, specific alert messages can be sent to an alert device 20 to test the operation of the alert device 20.

The present invention also operates to provide the ability to activate a backlight by pushing a standby button. Thus, if a user needs to view what is presently being displayed on the alert device 20, the user can simply actuate the standby button to turn on the backlighting.

The present invention also operates to provide a standby button to cause a message to scroll back at top of list. Thus, if more text that what can be displayed on the alert device 20 is available, a user can actuate the standby button to allow the message to be redisplayed and thus, the user can view the available text.

The present invention also operates to provide the ability to display multiple messages, in order of priority and time received. If multiple messages have been received by the alert device 20, in one embodiment, the alert device 20 can display the messages based on various factors, including but not limited to the priority of the message, the time the message was received, the appropriateness of the message, etc.

Whereas the invention has been described in detail with particular reference to its most preferred embodiments, it is understood that variations and modifications can be effected within the spirit and scope of the invention, as described herein before and as defined in the appended claims. The corresponding structures, materials, acts, and equivalents of all means or step plus function elements, if any, in the claims below are intended to include any structure, material, or acts for performing the functions in combination with other claim elements as specifically claimed.

What is claimed is:

1. An apparatus for providing location-specific alert information associated with an alert condition relevant to a geographical area, the location-specific alert information being broadcast within the geographical area by at least one transmitter of a wireless bi-directional communication network having a plurality of communication channels and a plurality of transmitters which are each positioned to provide communication services to specific geographical areas serviced by the communication network, said apparatus comprising:
   a receiver adapted to receive transmissions on a communication channel of the plurality of communication channels of the wireless bi-directional communication network;
   a peripheral device operable to indicate an alert condition; and,
   a controller communicatively connected to said receiver and said peripheral device, said controller being operable to continuously monitor a communication channel of the wireless bi-directional communication network for the receipt of a transmission of location-specific alert information from a transmitter servicing a specific geographical area and to operate said peripheral device in response to the reception of a transmission of location-specific alert information;
   wherein said controller is further operable to monitor said communication channel of said wireless bi-directional network for the receipt of a preferred system provider message and to update a preferred system provider list, based at least in part, on the reception of the preferred system provider message.

2. An apparatus for providing to a user alert information associated with an alert condition, the alert information being broadcast to by at least one transmitter of a wireless bi-directional communication network having a plurality of communication channels and a plurality of transmitters which are each positioned to provide communication services to persons in a particular respective geographical area serviced by the communication network, said apparatus comprising:
   a receiver adapted to receive transmissions on a communication channel of the plurality of communication channels of the wireless bi-directional communication network;
   a peripheral device operable to inform the user of the existence of a relevant alert condition; and,
   a controller communicatively connected to said receiver and said peripheral device, said controller being operable to continuously monitor a communication channel of the wireless bi-directional communication network for the receipt of a transmission of alert information from a transmitter and to operate said peripheral device in response to the reception of a transmission of alert information;
   wherein said controller is further operable to maintain a closed user group list used to filter out particular messages.

3. The apparatus of claim 2, wherein said controller is further operable to monitor said communication channel of said wireless bi-directional network for the receipt of a closed user group message and to update said closed user group list based at least in part on the reception of the closed user group message.

4. An apparatus for providing location-specific alert information associated with an alert condition relevant to a geographical area, the location-specific alert information being broadcast within the geographical area by at least one transmitter of a wireless bi-directional communication network having a plurality of communication channels and a plurality of transmitters which are each positioned to provide communication services to specific geographical areas serviced by the communication network, said apparatus comprising:

a receiver adapted to receive transmissions on a communication channel of the plurality of communication channels of the wireless bi-directional communication network;

a peripheral device operable to indicate an alert condition; and, a controller communicatively connected to said receiver and said peripheral device, said controller being operable to continuously monitor a communication channel of the wireless bi-directional communication network for the receipt of a transmission of location-specific alert information from a transmitter servicing a specific geographical area and to operate said peripheral device in response to the reception of a transmission of location-specific alert information;

wherein said controller is further operable to control an external device in response to the reception of a transmission of location-specific alert information.

5. The apparatus of claim 4, wherein the external device is a vibrator.

6. The apparatus of claim 4, wherein the external device is a mattress vibrator.

7. An apparatus for providing to a user alert information associated with an alert condition relevant to persons in the selected geographical area of the user, the alert information being broadcast to the selected geographical area by at least one transmitter of a wireless bi-directional communication network having a plurality of communication channels and a plurality of transmitters which are each positioned to provide communication services to persons in a particular respective geographical area serviced by the communication network, said apparatus comprising:

a receiver adapted to receive transmissions on a communication channel of the plurality of communication channels of the wireless bi-directional communication network;

a peripheral device operable to inform the user of the existence of a relevant alert condition; and, a controller communicatively connected to said receiver and said peripheral device, said controller being operable to continuously monitor a communication channel of the wireless bi-directional communication network for the receipt of a transmission of alert information from a transmitter servicing the selected geographical area of the user and to operate said peripheral device in response to the reception of a transmission of alert information;

wherein said controller is further operable to detect the actuation of a standby button and perform a function based on the actuation of said standby button.

8. The apparatus of claim 7, wherein the controller is operable to turn on a backlight in response to the actuation of said standby button.

9. The apparatus of claim 7, wherein the controller is operable to reset the scrolling of a message on a display to the beginning of the message in response to the actuation of the standby button.

10. A method of operating a device having a receiver and a peripheral device to receive alert information pertaining to an alert condition which is broadcast by a wireless bi-directional communication network having a plurality of communication channels and to inform a user of the existence of the alert condition, the method comprising the steps of:

selecting a communication channel from the plurality of communication channels of the wireless bi-directional communication network;

monitoring the selected communication channel with the receiver for a transmission of a control message;

reconfiguring the device in accordance with the control message, the reconfiguration influencing subsequent operation of the device;

monitoring the selected communication channel with the receiver for a transmission including alert information pertaining to the alert condition; and, operating the peripheral device to notify the user of the alert condition upon detection of a transmission including alert information.

11. The method of claim 10, wherein the control message is a provisioning level setting message, and the step of reconfiguring the device comprises setting the device to operate in accordance with the provisioning level identified in the provisioning level setting message.

12. The method of claim 10, wherein the control message is a standby message setting message and the step of reconfiguring the device comprises storing the standby message in the device for display in response to the reception of particular alert information.

13. The method of claim 10, wherein the control message is an activate standby message and the step of reconfiguring the device comprises activating the standby message identified in the activate standby message message.

14. The method of claim 10, wherein the control message is a serial number specific message and only the device containing the serial number identified in the serial number specific message will operate on the received message.

15. The method of claim 10, wherein the control message is a preferred system provider update message and the step of reconfiguring the device comprises updating a preferred system provider list in accordance with the preferred system provider update message.

16. The method of claim 10, wherein the control message is a controlled user group update message and the step of reconfiguring the device comprises updating a controlled user group list in accordance with the preferred system provider update message.

17. A receiver module for receiving a location-specific alert information being broadcast within a geographical area by at least one transmitter of a wireless bi-directional communication network having a plurality of communication channels, the receiver module comprising:

a processor adapted to process the location-specific alert information, said processor adapted to be coupled to a receiver adapted to receive transmissions on a communication channel of the plurality of communication channels of the wireless bi-directional communication network; and an input/output (I/O) port coupled to said processor, wherein the receiver is adapted to receive the location-specific alert information and said processor is adapted to process the location-specific alert information when the receiver module is within a certain geographic area.

18. The receiver module according to claim 17, further comprising at least one user alerting device coupled to said I/O port.

19. The receiver module according to claim 18, wherein said user alerting device comprises at least one of a vibrating device, a sound emitting device, a light emitting device, a power supply, a reset device or an antenna connector.

20. The receiver module according to claim 17, wherein the receiver module is adapted to be incorporated into at least one of a standalone device, an integrated device or an attached device.

* * * * *